(12) United States Patent
Munson

(10) Patent No.: US 12,195,070 B2
(45) Date of Patent: *Jan. 14, 2025

(54) MOBILE SERVING DEVICE AND METHOD

(71) Applicant: Barmobile, LLC, Prairie Village, KS (US)

(72) Inventor: Joseph Munson, Prairie Village, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/389,317

(22) Filed: Nov. 14, 2023

(65) Prior Publication Data

US 2024/0075972 A1 Mar. 7, 2024

Related U.S. Application Data

(63) Continuation of application No. 17/308,923, filed on May 5, 2021, now Pat. No. 11,814,094.

(60) Provisional application No. 63/020,334, filed on May 5, 2020.

(51) Int. Cl.
| | |
|---|---|
| *B62B 3/00* | (2006.01) |
| *A47B 31/00* | (2006.01) |
| *A47B 31/02* | (2006.01) |
| *A47J 47/14* | (2006.01) |
| *F25D 11/00* | (2006.01) |

(52) U.S. Cl.
CPC .............. *B62B 3/005* (2013.01); *A47B 31/02* (2013.01); *A47J 47/14* (2013.01); *F25D 11/00* (2013.01); *A47B 2031/003* (2013.01)

(58) Field of Classification Search
CPC ......... B62B 3/005; A47B 31/00; A47B 31/02; A47B 2031/002; A47B 2031/003; A47B 2031/008
See application file for complete search history.

(56) References Cited

U.S. PATENT DOCUMENTS

| | | |
|---|---|---|
| 1,516,006 A | 11/1924 | Fox |
| 1,913,387 A | 6/1933 | Hayward |
| 2,725,274 A | 11/1955 | Stivale |
| 3,748,437 A | 7/1973 | Keeshin et al. |
| 3,877,744 A | 4/1975 | Miller |
| 3,949,902 A | 4/1976 | Thompson |

(Continued)

FOREIGN PATENT DOCUMENTS

WO 9415824 7/1994

*Primary Examiner* — Daniel J Rohrhoff
(74) *Attorney, Agent, or Firm* — Law Office of Mark Brown, LLC; Christopher M DeBacker; Mark E Brown

(57) ABSTRACT

A compact, mobile serving cart for efficient preparation and service of cocktails, beverages, food, and/or other items to be served configured for service in a mobile, serve on the go configuration or service in a compact, stationary service configuration. The mobile serving cart includes a frame, side panels, wheels, and a user handle for pushing and maneuvering the cart. The mobile serving cart further includes a cooler assembly; a designated work tray space; a garnish and tool holder assembly; and driver-side drawers openable toward a user and configured for housing various ingredients, service tools, glassware, and other objects desirable for service of beverages, food, etc. In an exemplary embodiment, the mobile serving cart further includes removable caddies and mountable service accessories for smooth transition from service on the go to a compact, stationary, full-service bar.

13 Claims, 41 Drawing Sheets

(56) References Cited

U.S. PATENT DOCUMENTS

| | | | |
|---|---|---|---|
| D331,334 S * | 12/1992 | Hollington | D6/667 |
| 5,437,165 A | 8/1995 | White et al. | |
| 5,626,353 A | 5/1997 | Campbell | |
| 5,715,953 A | 2/1998 | Brown | |
| 6,474,677 B2 | 11/2002 | Kasuya | |
| 6,561,599 B2 * | 5/2003 | Itakura | A47B 46/00 312/205 |
| 6,663,202 B2 * | 12/2003 | Spann | A61G 12/001 312/249.12 |
| 7,040,114 B2 * | 5/2006 | Lee | A47B 77/08 312/405 |
| 7,213,817 B2 * | 5/2007 | Cheung | B62B 3/025 280/47.35 |
| 7,544,915 B2 | 6/2009 | Hu | |
| 7,661,459 B2 | 2/2010 | Wesley et al. | |
| 8,267,490 B2 | 9/2012 | Demars | |
| 8,550,477 B2 | 10/2013 | Bennett et al. | |
| 8,596,654 B2 | 12/2013 | Belanger et al. | |
| 8,936,260 B2 | 1/2015 | Burd | |
| 9,033,278 B2 | 5/2015 | Van Loon et al. | |
| 9,193,462 B2 | 11/2015 | Burd | |
| 9,457,828 B1 | 10/2016 | Guirlinger | |
| 9,481,386 B2 | 11/2016 | Martell et al. | |
| 9,872,573 B1 | 1/2018 | Yates et al. | |
| 9,877,577 B2 | 1/2018 | Knighton | |
| 9,989,299 B1 * | 6/2018 | Ballard | B65D 81/3813 |
| 10,029,721 B2 | 7/2018 | Jackson | |
| 10,463,174 B2 | 11/2019 | Hesselmann et al. | |
| 11,172,758 B1 | 11/2021 | Stewart | |
| 11,614,266 B1 * | 3/2023 | Sutton | A47B 69/00 220/592.2 |
| 11,814,094 B2 * | 11/2023 | Munson | B62B 3/004 |
| 2017/0340105 A1 * | 11/2017 | Knighton | B62B 3/005 |
| 2021/0037964 A1 | 2/2021 | Lamson et al. | |
| 2022/0228794 A1 * | 7/2022 | Whyman | F25D 21/14 |
| 2023/0143591 A1 * | 5/2023 | Söödi | B62B 3/004 280/47.34 |

\* cited by examiner

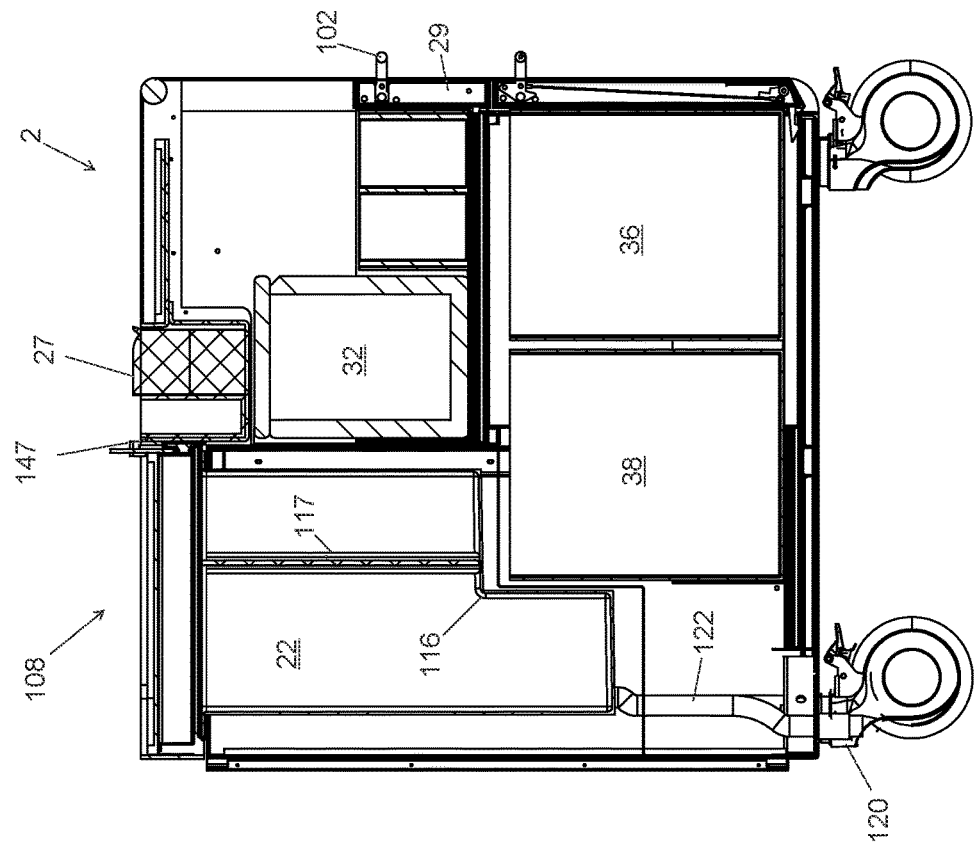
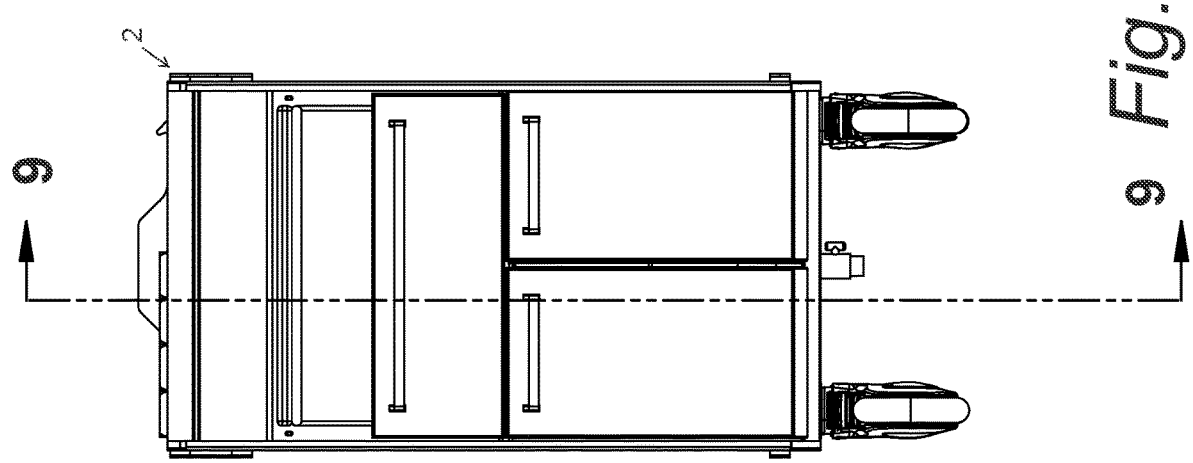

MOBILE SERVING DEVICE AND METHOD

CROSS-REFERENCE TO RELATED APPLICATION

This application is a continuation of and claims priority in U.S. patent application Ser. No. 17/308,923 Filed May 5, 2021, now U.S. Pat. No. 11,814,094 which is incorporated herein by reference.

BACKGROUND OF THE INVENTION

1. Field of the Invention

The present invention relates generally to serving devices and methods of use thereof and, more specifically, to a mobile serving device configured for efficient preparation and service of drinks and/or food.

2. Description of the Related Art

Typically, in the food and beverage service industry, serving beverages to customers requires first taking the customers' beverage orders, relaying the beverage orders to a separate bar or kitchen, a bartender or server preparing the beverages at the separate bar or kitchen, and then the server or a runner delivering the beverages to the customers via a serving tray or serving cart. Often, this process can be time consuming, resulting in longer than desired wait times for customers between ordering and receiving their beverages. Moreover, if any one step in the standard beverage ordering and serving process is delayed, customer wait time for beverages is further delayed. For example, a server getting sidetracked prior to relaying the beverage order to the bar; a bartender busy with preparing other beverage orders; a server or runner not immediately noticing that beverages are made and ready to be served; and/or a server or runner spilling drinks from a serving tray or serving cart can result in longer customer wait times for beverages.

Additionally, many restaurants and bars offer specialty drinks and cocktails. Such specialty drinks may include special ingredients or unique preparation steps. Viewing the mixture of these special ingredients and/or preparation steps may provide entertainment value to customers. Other beverages have recipes which are variable depending on the customer's preferences. Thus, it may be preferable to prepare beverages directly in front of the customer for entertainment purposes and/or to accommodate customer input regarding various ingredients. A further benefit of making beverages tableside for customers seated at tables is that it is likely to free up time for bartenders to prepare beverages more quickly for customers ordering at the primary bar.

However, standard serving carts are not equipped with features for efficient preparation of beverages on the move. For example, many carts are difficult to maneuver around dining tables and people without running into things or causing customers to feel crammed while next to the cart. Additionally, standard serving carts typically do not have designated places for preparing beverages on the cart itself or designated places for housing ingredients, glassware, ice, and other beverage service items. As a result, preparing drinks on such a serving cart can result in inferior quality of drinks, additional spills, and/or additional broken glassware. Existing serving carts may also have a limited capacity for housing ingredients and glassware, requiring frequent trips to a separate bar or kitchen to restock the cart, decreasing beverage serving efficiency.

Oftentimes, a primary bar can get overcrowded with customers, leading to long wait times to order and receive beverages, particularly at popular bars, nightclubs, or events, such as but not limited to sporting events, conventions, and concerts. In such situations, it may be desirable to set up one or more secondary bars. However, typical temporary bars have disadvantages. Some temporary bars are so large that they decrease the capacity for customers and/or are strenuous to set up. Other temporary bars are compact but lack capacity for a full amount of ingredients, limiting the types of beverages available at the secondary bar.

What is needed is a compact serving cart and method of use for efficient beverage preparation and service when moving from customer to customer and when establishing a stationary bar configuration. Heretofore there has not been available a mobile serving device and method of use with the advantages and features of the present invention.

SUMMARY OF THE INVENTION

The present invention discloses a compact, ergonomic, mobile serving cart for quick and easy preparation and service of cocktails, beverages, food, and/or other items to be served. In an aspect of the present invention, the mobile serving cart includes multiple, easily-changeable configurations, including but not limited to a motive, serve on the go configuration and a stationary serving configuration. The serving cart of the present invention can seamlessly transition between use for preparation and service of beverages tableside, poolside, or in another location where service independent of a traditional bar is desirable and use as a full-service bar in a compact space.

In an aspect of the present invention, the mobile serving cart has a compact, streamlined shape to easily accommodate weaving in and out of crowds and dining rooms and safe and comfortable operation by one operator. In a preferred embodiment, the mobile serving cart includes rounded front corners to eliminate sharp edges for added safety while in use. Designated workspaces and compartments throughout the compact, mobile serving cart design are utilized for increased capacity and utility, with all the cart's contents arranged within an arm's length of the operator. In an exemplary embodiment, frequently used items are situated closest to the operator allowing for quick service on the fly, and speed rail and bar top attachments are stowed and ready to quickly set up and use in the stationary bar configuration. Additionally, the present invention includes an efficient storage configuration allowing the mobile serving cart to be operated for extended periods of time without needing to restock the cart.

In an aspect of the present invention, the mobile serving cart includes a frame, side panels, wheels, and a user handle for pushing and maneuvering the cart. The mobile serving cart further includes a cooler assembly; a designated work tray space; a garnish and tool holder assembly; and driver-side drawers openable toward a user and configured for housing various ingredients, service tools, glassware, and other objects desirable for service of beverages, food, etc. Additionally, the mobile serving cart includes upper and lower rail moldings which extend along the sides and front of the cart. These rail moldings are spaced out from the cart side panels a distance with spacer pieces and serve multiple purposes. In the mobile serve on the go configuration of the present invention, the rail moldings act as bumpers when a user moves the serving cart around tables, crowds, and other objects. In a stationary configuration, the rail moldings are configured for mounting objects from the moldings.

In an exemplary embodiment of the present invention, the cart drawers house removable caddies for holding bottles, glassware, bar tools, supplies, etc. In a preferred embodiment two of the removable caddies are long and narrow—approximately a width slightly wider than a standard, one-liter bottle—and configured to be mountable bartending speed rails for attachment to the mobile serving cart rail moldings in the stationary service configuration. Such embodiment further includes a stowable bar top attachment configured for being mounted on the serving cart in the assembled configuration to give customers a space to place their drinks and other belongings. Embodiments of the present invention may further include a mountable shelf and/or additional mountable features desirable for serving beverages, food, or other items.

In an exemplary embodiment of the present invention, the top of the mobile serving cart includes a designated space for beverage preparation; a built-in cavity for housing beverage garnishes, alternative beverage ingredients, drinkware, and/or beverage making tools and supplies; and a cooler for housing cold beverages and ingredients. In a preferred embodiment, the cooler lid provides a secondary work space and slides to allow access to the inside of the cooler. Beneath the primary work tray includes a partially open, sliding drawer configured for housing ingredient bottles and/or drinkware and an ice chest configured for being filled with ice for beverages. Preferably, the opening in this drawer is configured for allowing removal and insertion of bottles to and from the drawer without having to open the drawer, as desired by the operator. On a bottom row of the mobile serving cart are additional sliding drawers configured for housing speed rail caddies, a mountable bar top, a mountable shelf, a removable trash can, and storage for glassware, additional bottles, and/or other beverage serving supplies. In a preferred embodiment, the cart further includes a drain configured for allowing the cooler to be drained.

The present invention allows an operator to efficiently prepare and serve beverages from the same end the cart is pushed, providing a smooth transition from rolling the cart to serving beverages in the serve on the go configuration. In the stationary service configuration, the serving cart of the present invention can be utilized as a stationary bar that operates from the side like a traditional bar and incorporates an auxiliary bar surface. In a preferred embodiment, caddies configured for housing bottles, glassware, and/or the ice chest can be removed from the sliding drawers and mounted on the moldings facing the operator, accommodating more efficient beverage making from the side of the serving cart. A bar top attachment can be utilized on the customer-facing side of the serving cart. The features of the present invention accommodate quick and efficient set-up of a full-service bar in a compact space. Furthermore, the mobile serving cart of the present invention can also become a valuable branding tool for the purveyor of the cart as its sleek design and detailing provide an excellent canvas for logos and custom graphics.

Heretofore, there has not been a mobile serving cart and method with the combination of features and advantages of the present invention.

BRIEF DESCRIPTION OF THE DRAWINGS

The drawings constitute a part of this specification and include exemplary embodiments of the present invention illustrating various objects and features thereof.

FIG. 8 is a reference, back, elevational view of the mobile serving cart illustrating the cross-section location of FIG. 9.

FIG. 9 shows a left-center, left to right, cross-sectional, elevational view of the mobile serving cart.

DETAILED DESCRIPTION OF THE PREFERRED EMBODIMENTS

I. Introduction and Environment

Figure 1:
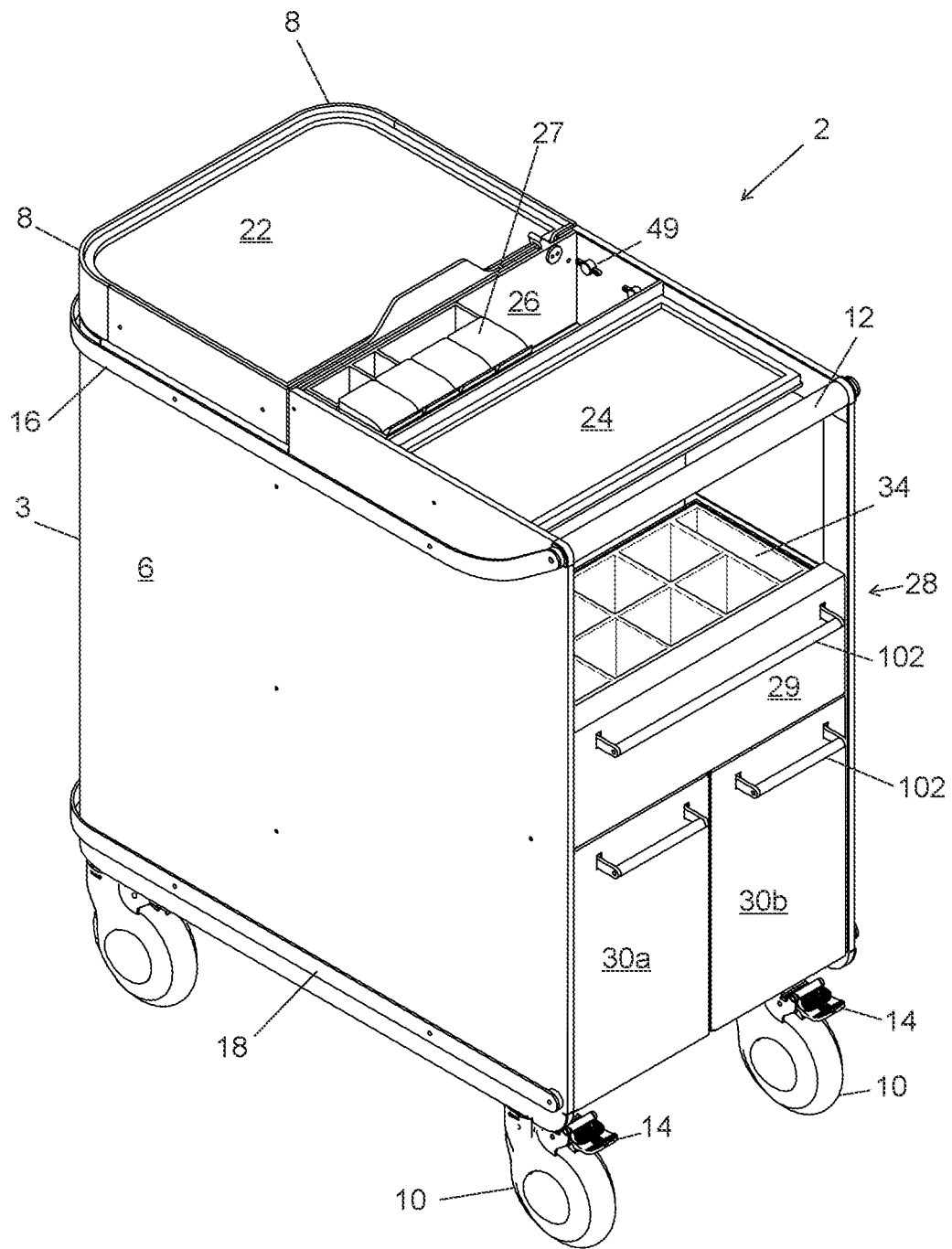
FIG. 1 is an upper, back, left, perspective view of a mobile serving cart embodying the present invention.
Figure 2:
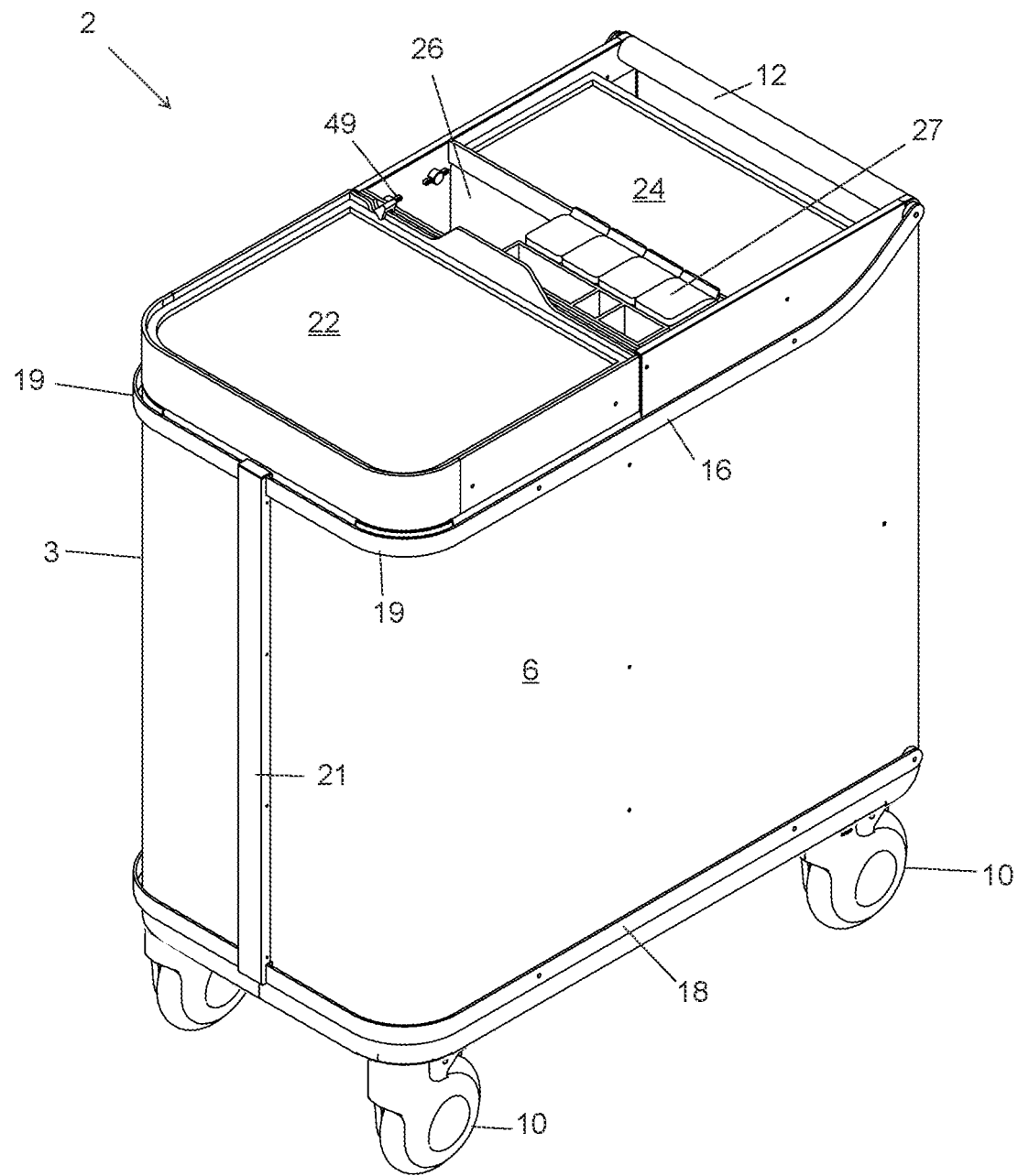
FIG. 2 is an upper, front, left, perspective view of the mobile serving cart.
Figure 3:
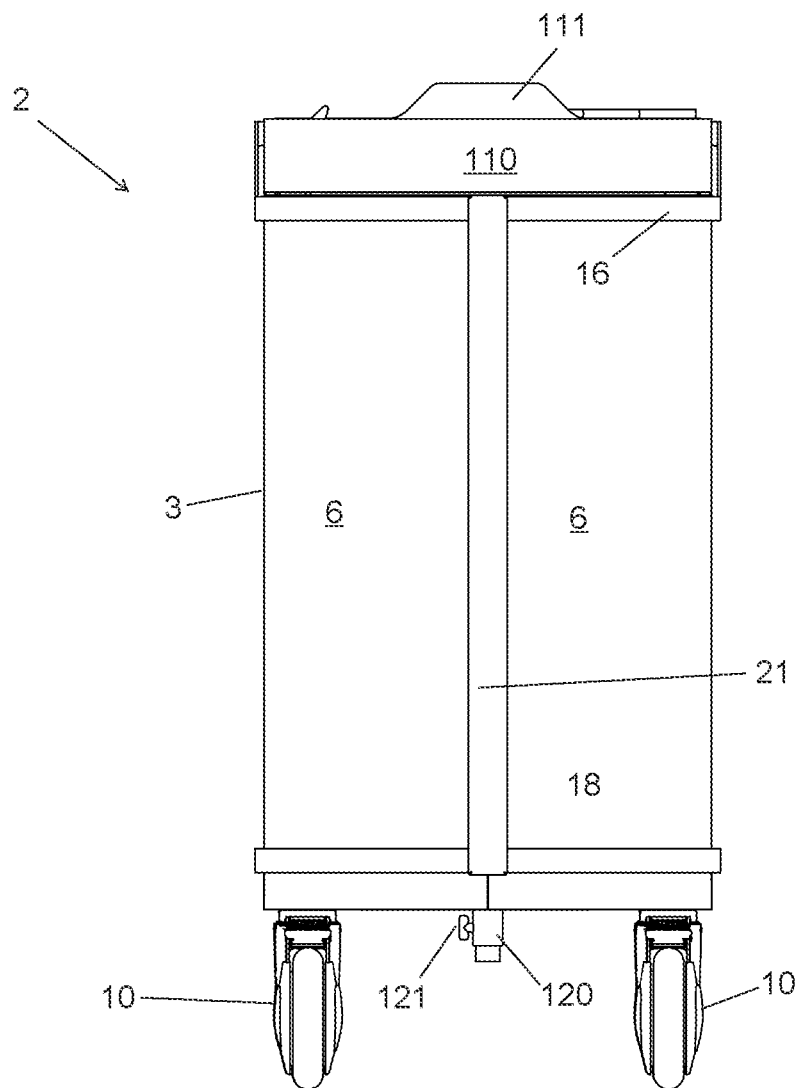
FIG. 3 shows a front, elevational view of the mobile serving cart.
Figure 4:
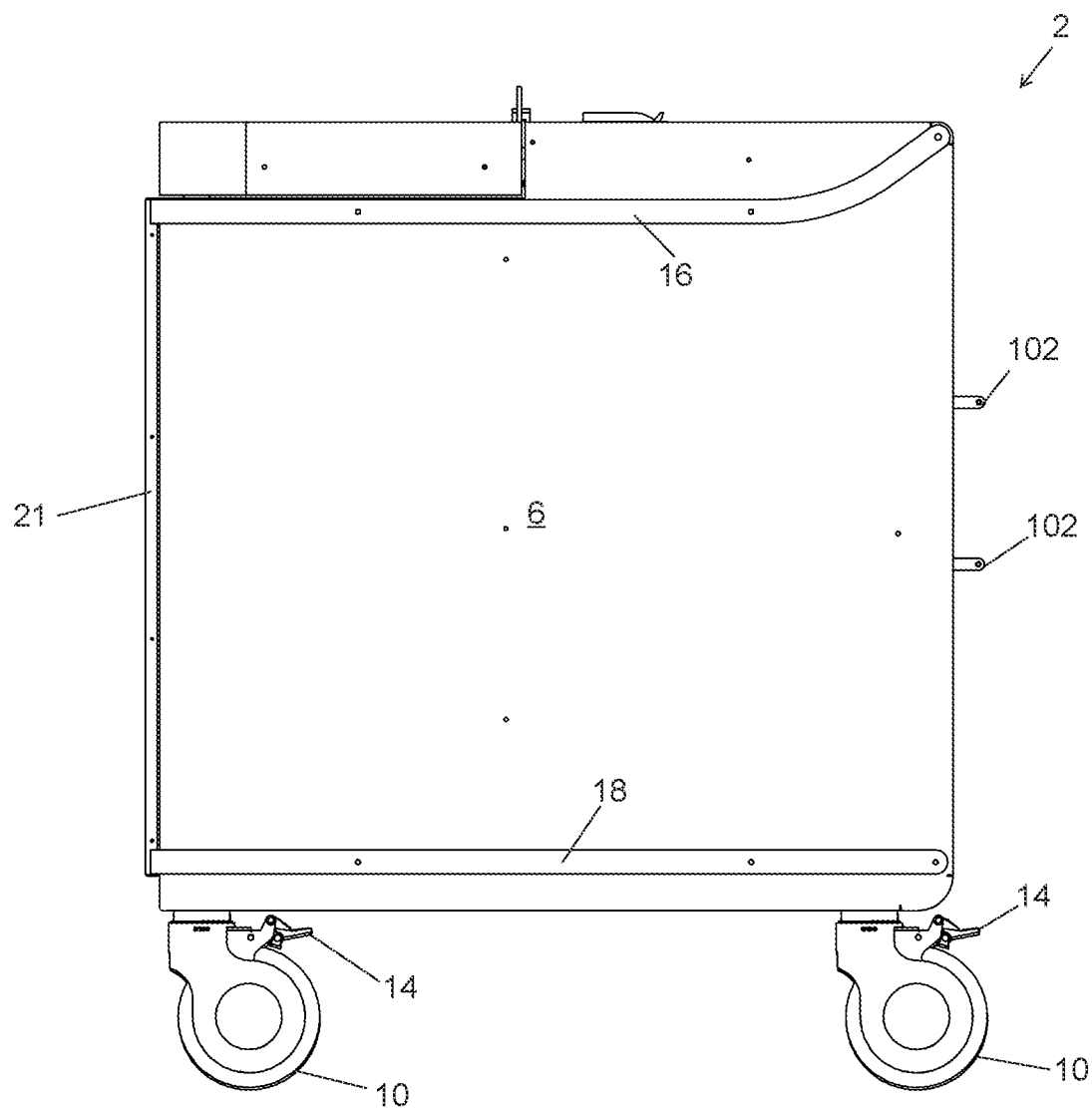
FIG. 4 is a left, side, elevational view of the mobile serving cart.
Figure 5:
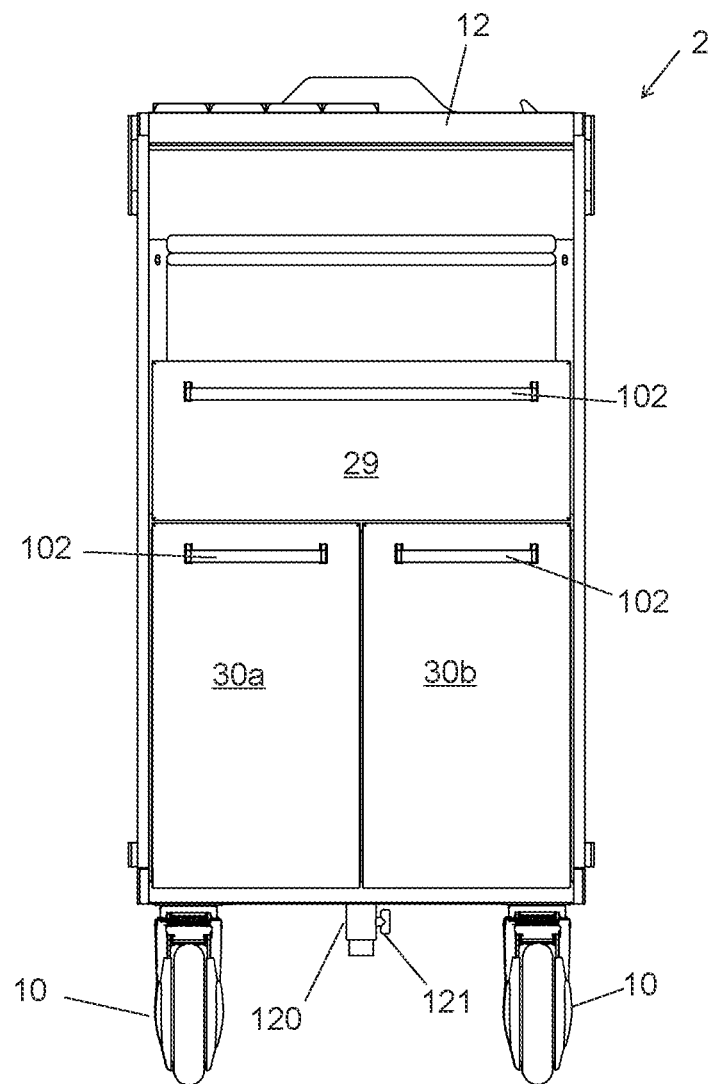
FIG. 5 is a back, elevational view of the mobile serving cart.
Figure 6:
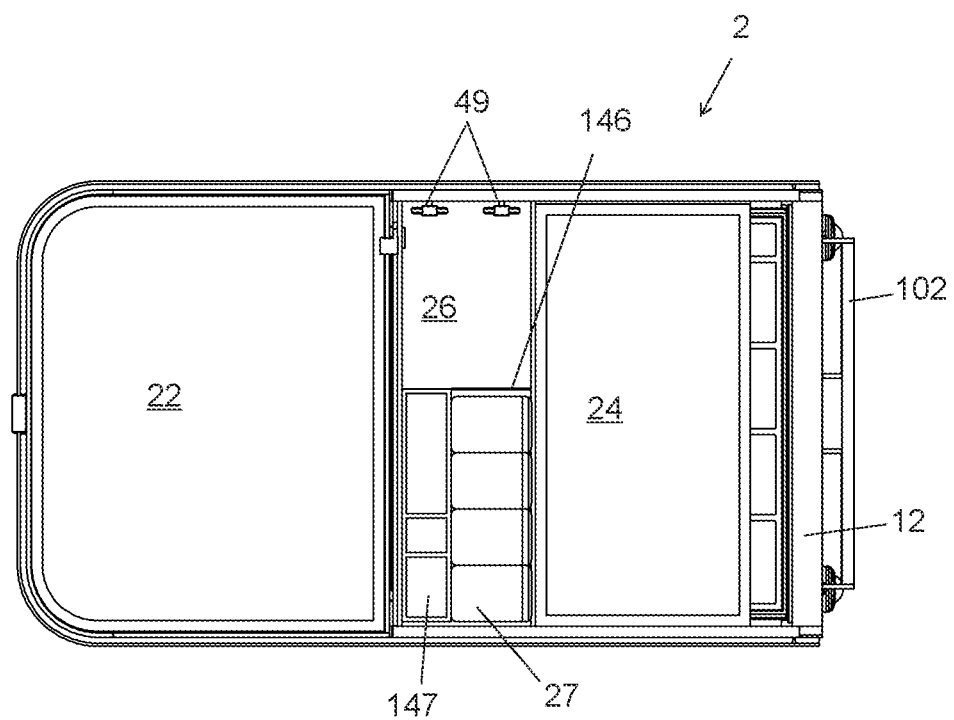
FIG. 6 shows a top, plan view of the mobile serving cart.
Figure 7:
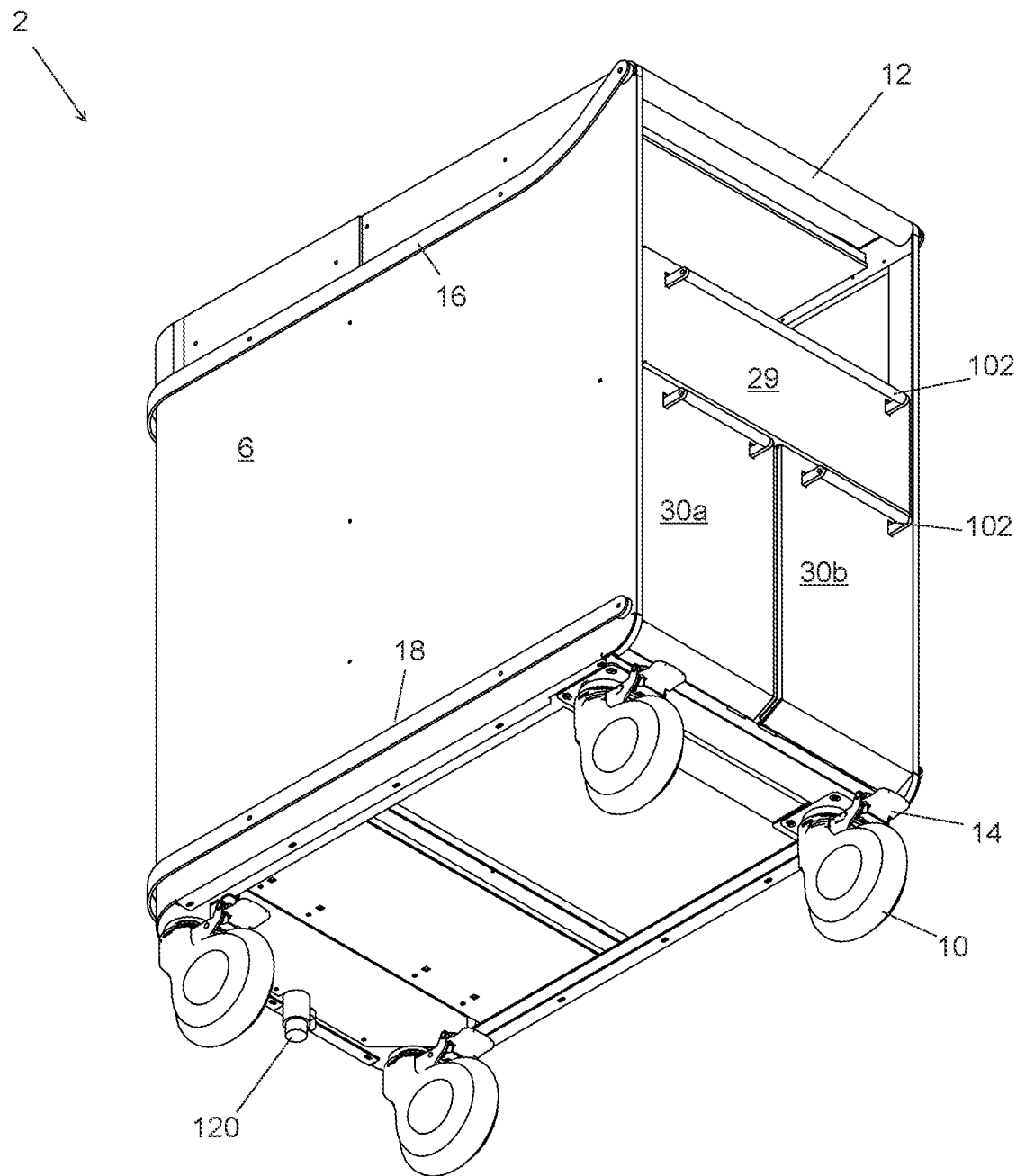
FIG. 7 is a bottom, back, left, perspective view of the mobile serving cart.
Figure 10:
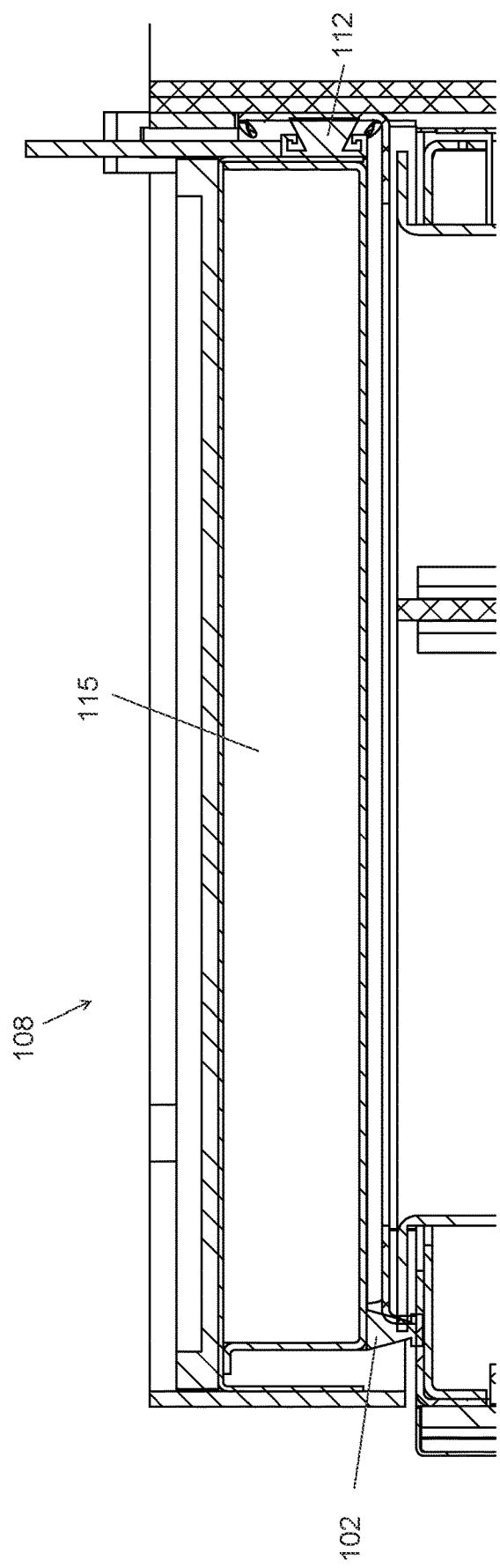
FIG. 10 shows an enlarged, left-center, left to right, cross-sectional, elevational view of a cooler door assembly of the mobile serving cart.
Figure 12:
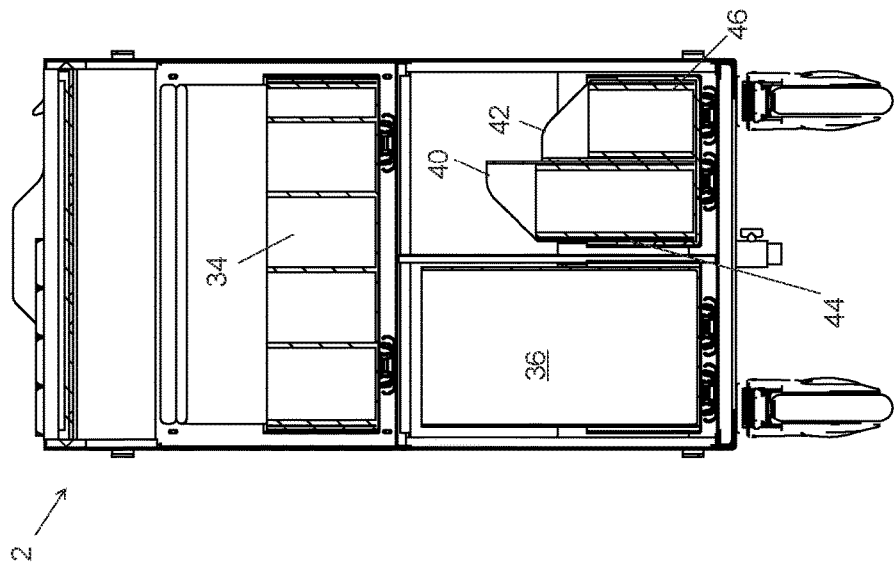
FIG. 12 shows a back to front, cross-sectional, elevational view of the mobile serving cart.
Figure 11:
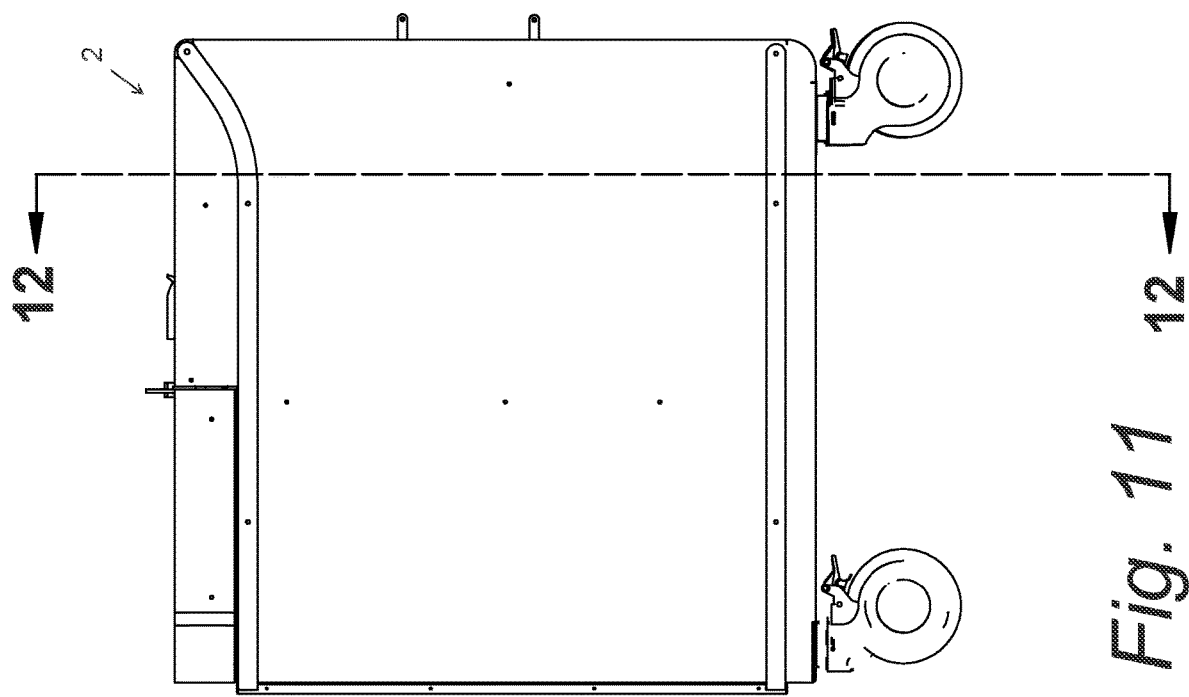
FIG. 11 is a reference, left, side, elevational view of the mobile serving cart illustrating the cross-section location of FIG. 12.
Figure 14:
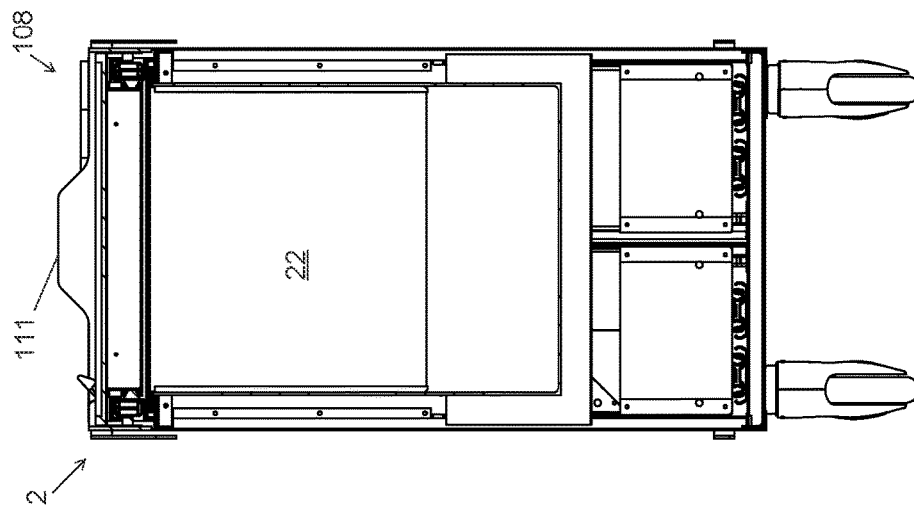
FIG. 14 shows a front to back, cross-sectional, elevational view of the mobile serving cart.
Figure 13:
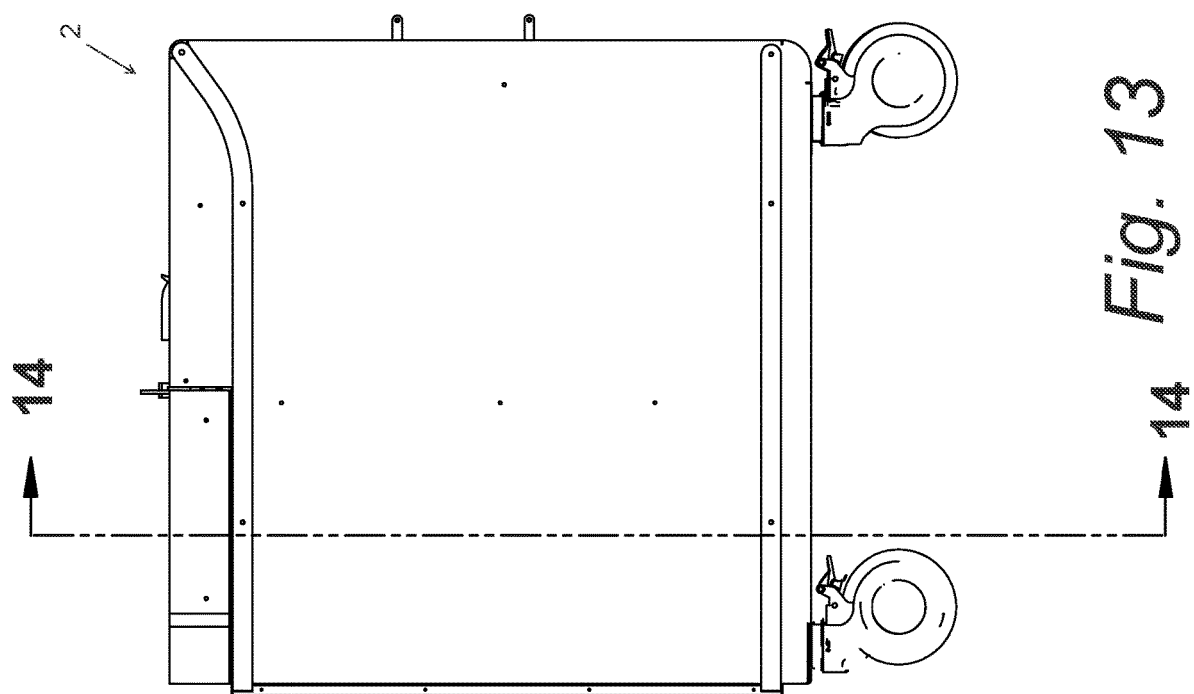
FIG. 13 is a reference, left, side, elevational view of the mobile serving cart illustrating the cross-section location of FIG. 14.
Figure 16:
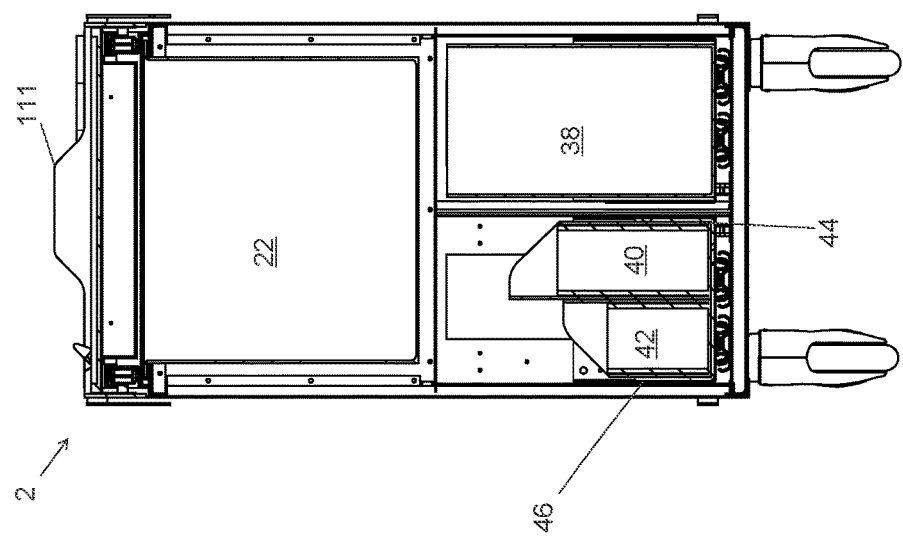
FIG. 16 shows a front-center, front to back, cross-sectional, elevational view of the mobile serving cart.
Figure 15:
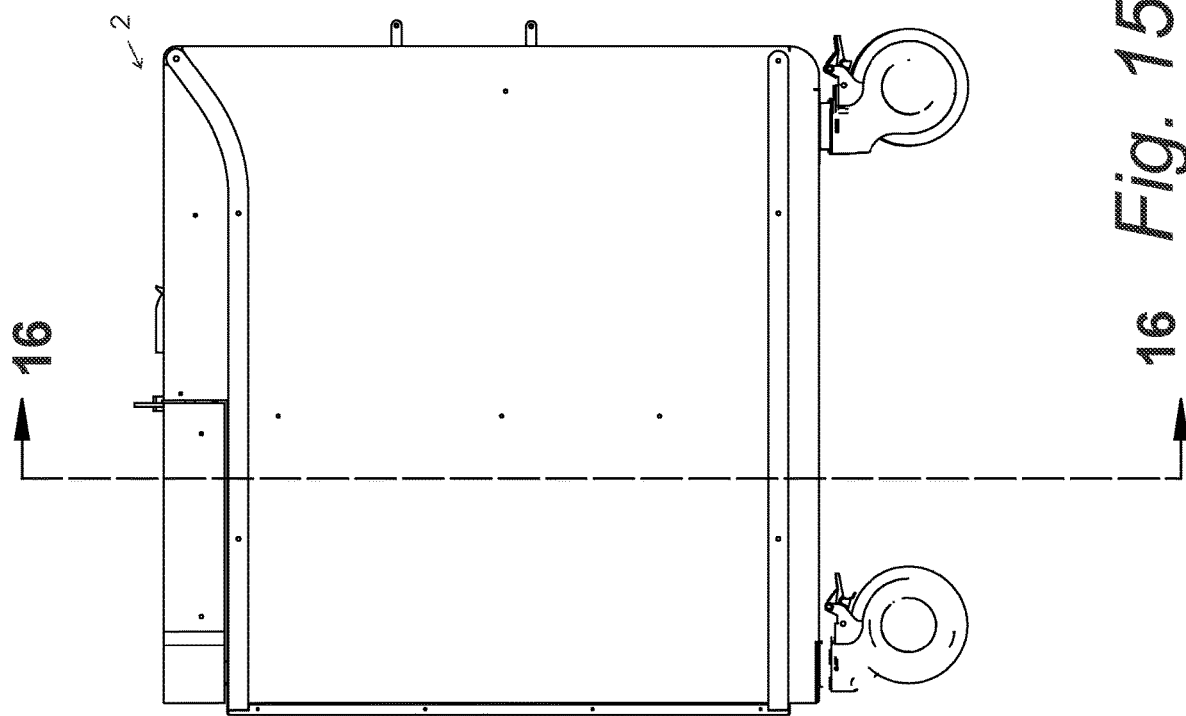
FIG. 15 is a reference, left, side, elevational view of the mobile serving cart illustrating the cross-section location of FIG. 16.
Figure 17:
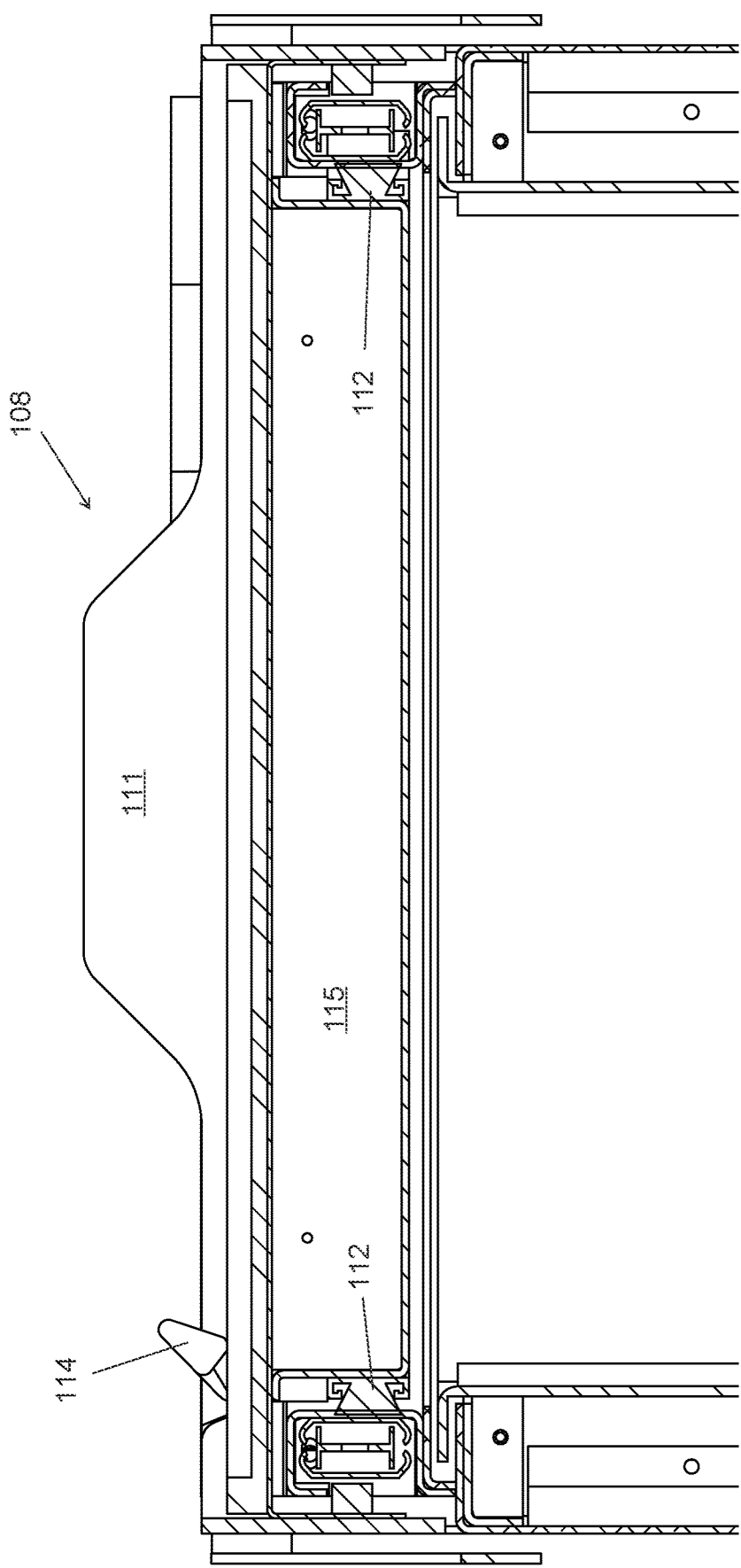
FIG. 17 is an enlarged, front-center, front to back, cross-sectional, elevational view of a cooler door assembly of the mobile serving cart.
Figure 18:
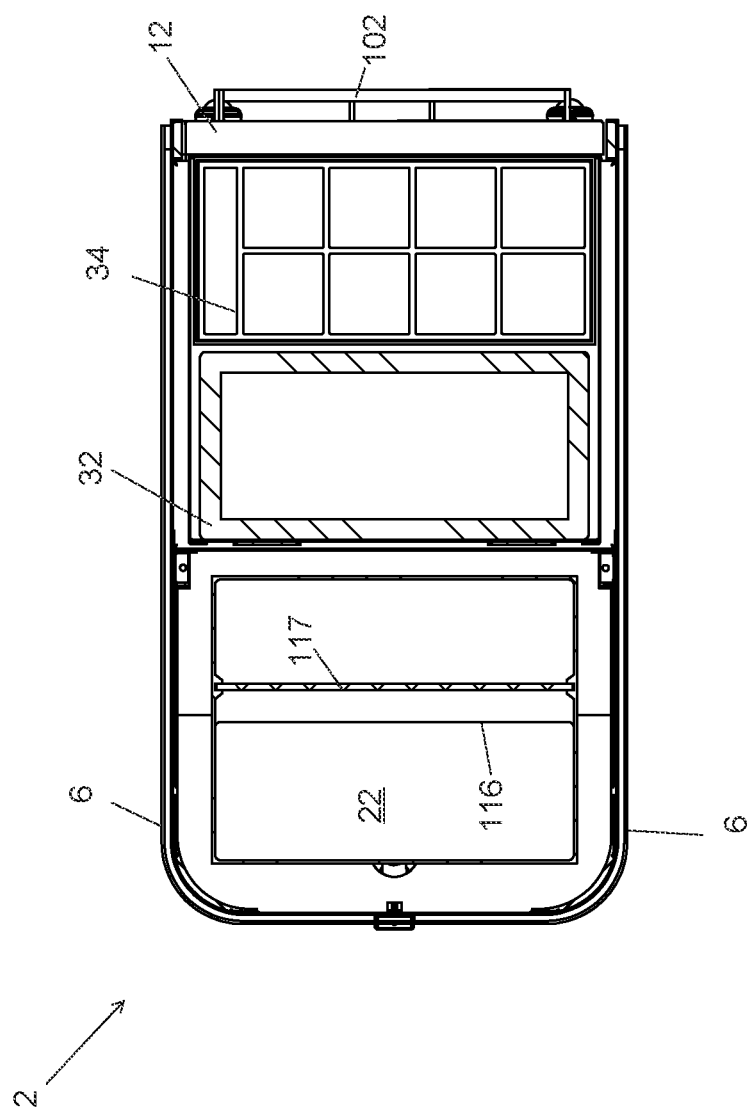
FIG. 18 shows an approximate center, cross-sectional, plan view of the mobile serving cart.
Figure 19:
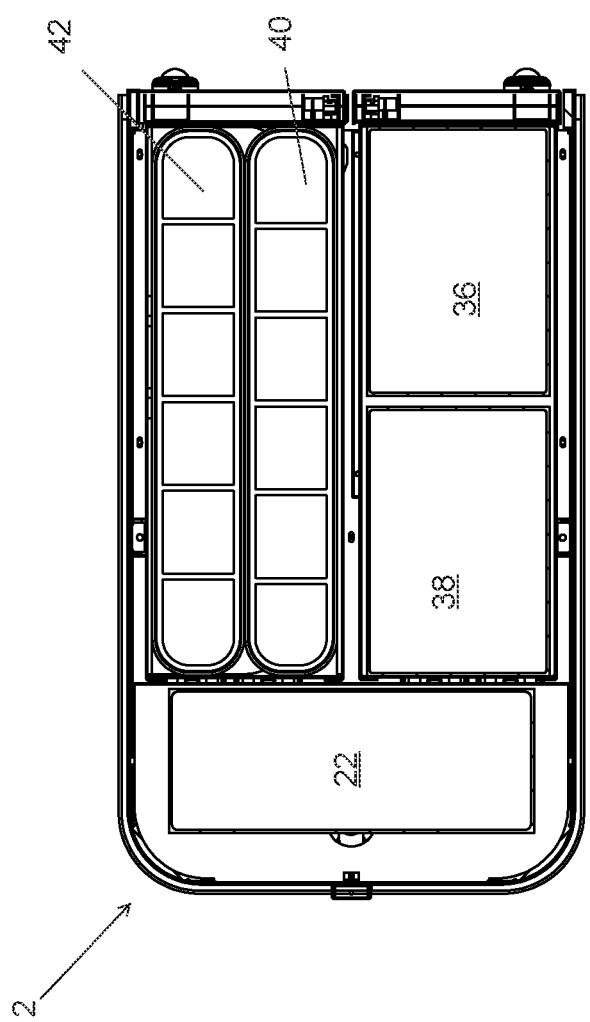
FIG. 19 shows a lower, cross-sectional, plan view of the mobile serving cart.
Figure 20:
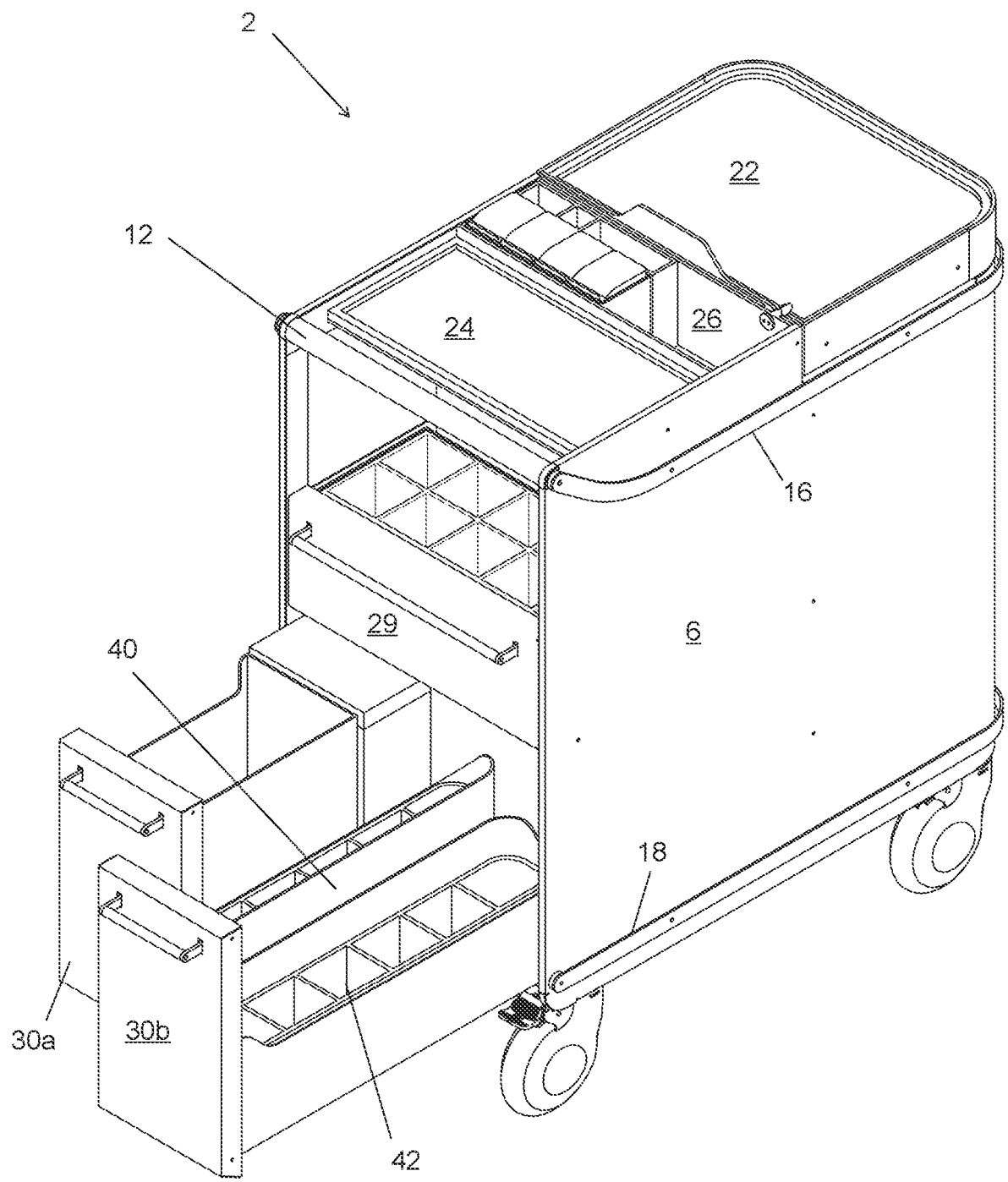
FIG. 20 is an upper, back, right, perspective view of the mobile serving cart showing the bottom drawers open.
Figure 21:
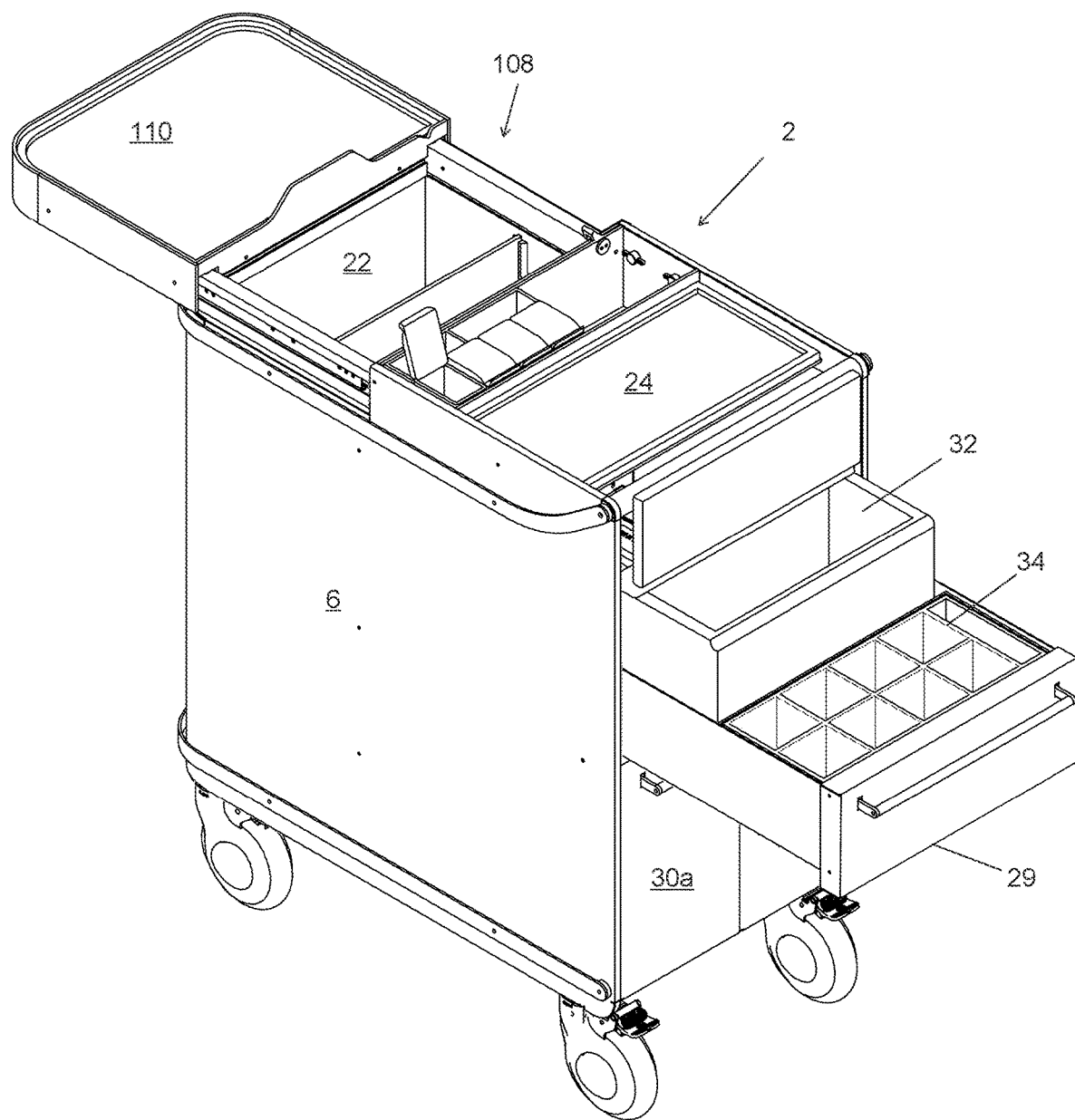
FIG. 21 is an upper, back, left, perspective view of the mobile serving cart showing the top drawer, ice chest, cooler door, and a garnish tray open.
Figure 22:
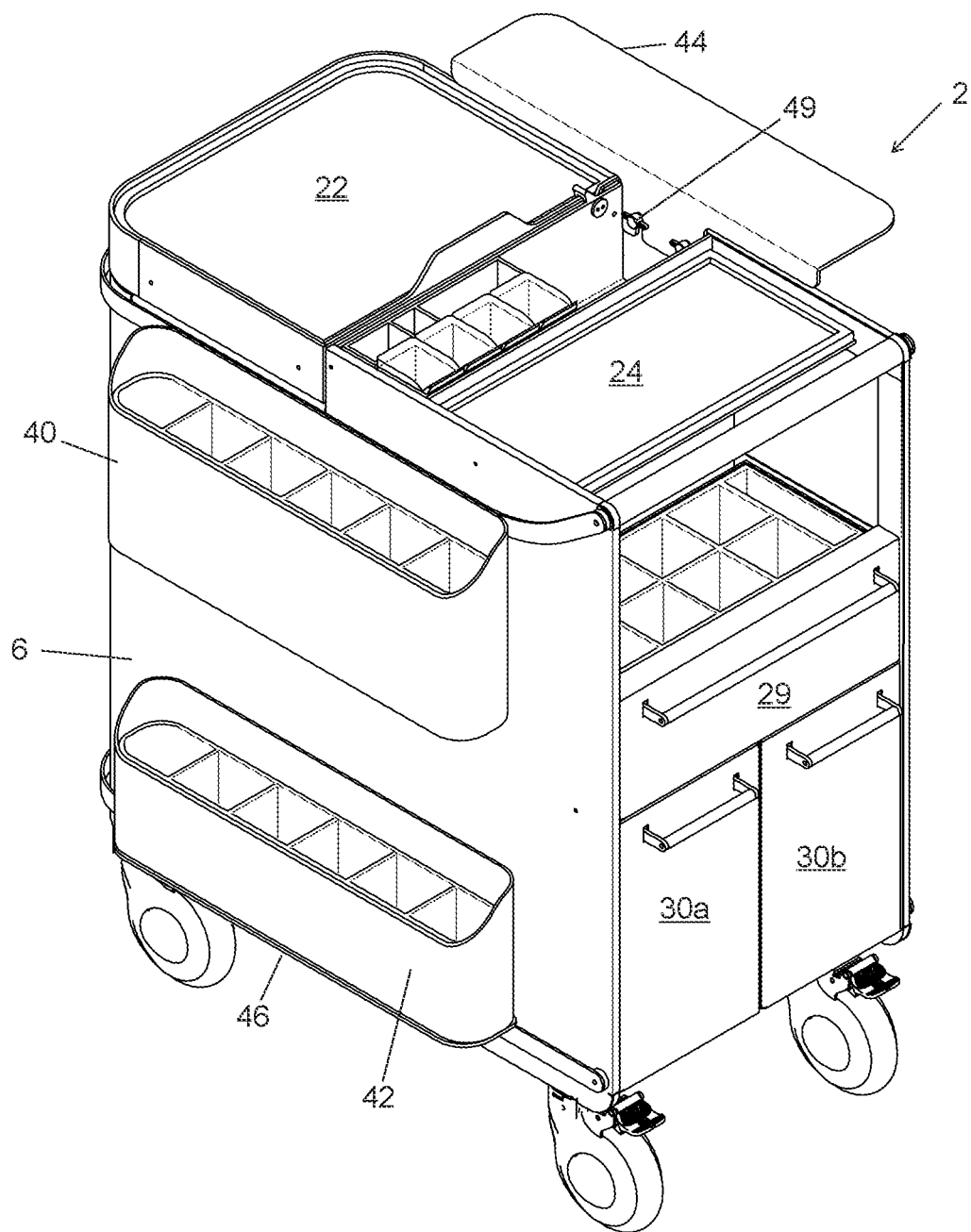
FIG. 22 shows and upper, back, left, perspective view of the mobile serving cart in a stationary service configuration mounting a bar top surface and upper and lower speed rails.
Figure 23:
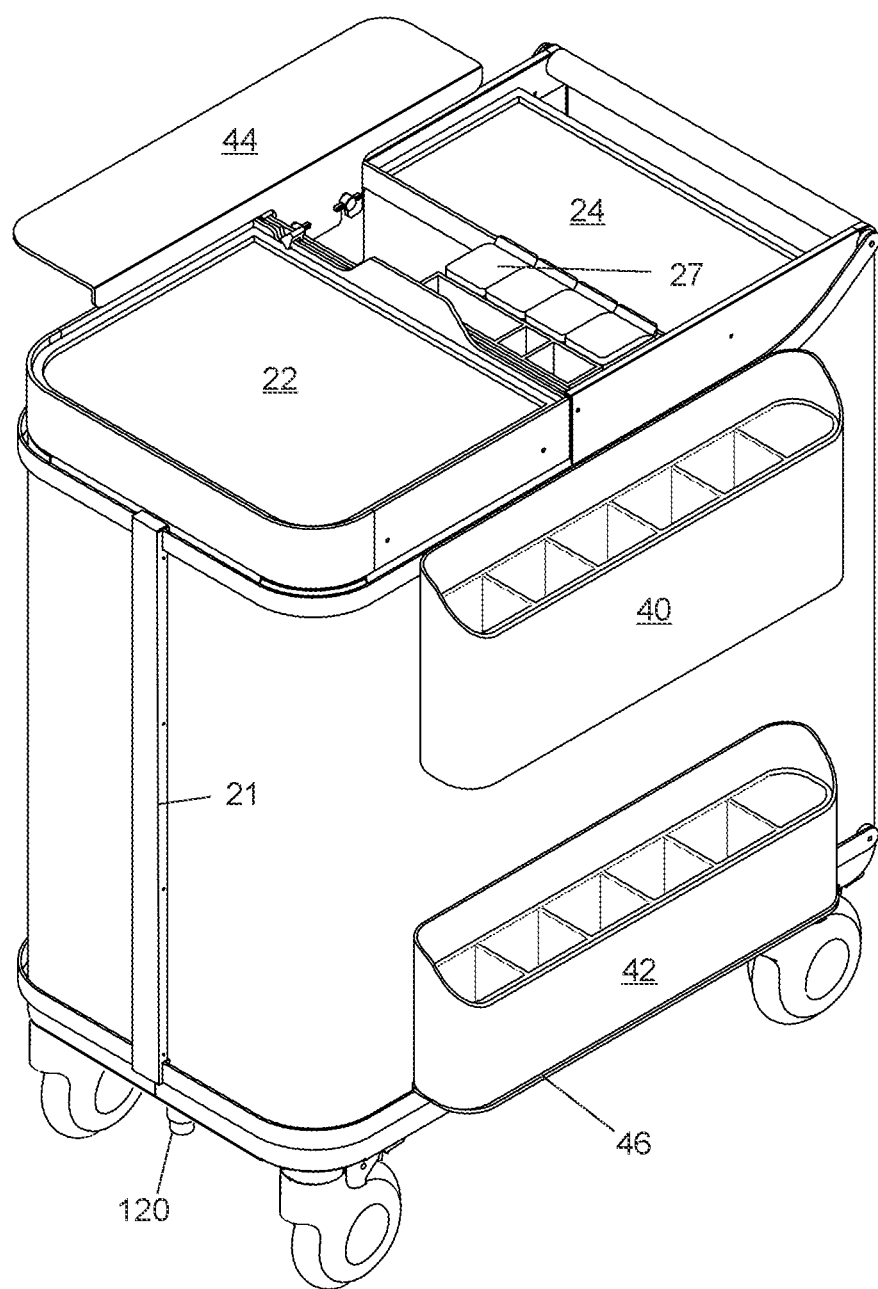
FIG. 23 is an upper, front, left, perspective view of the mobile serving cart in a stationary service configuration.
Figure 24:
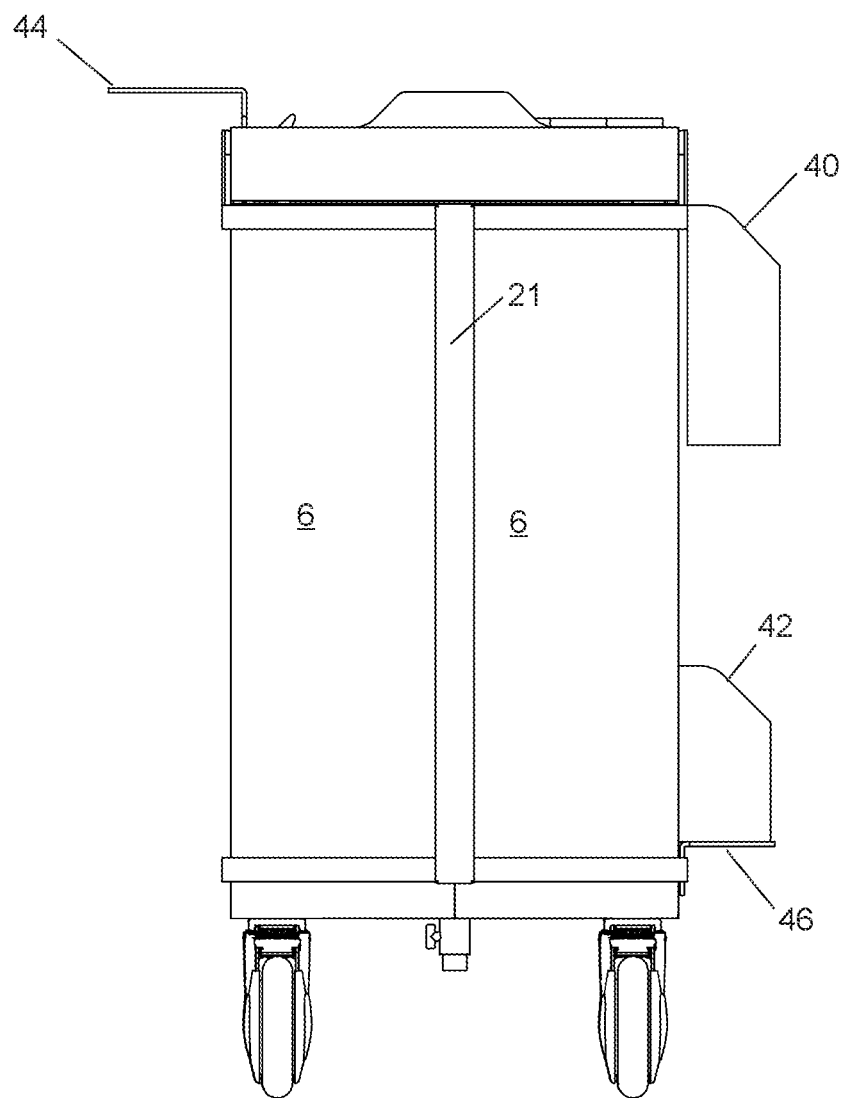
FIG. 24 is a front, elevational view of the mobile serving cart in a stationary service configuration.
Figure 25:
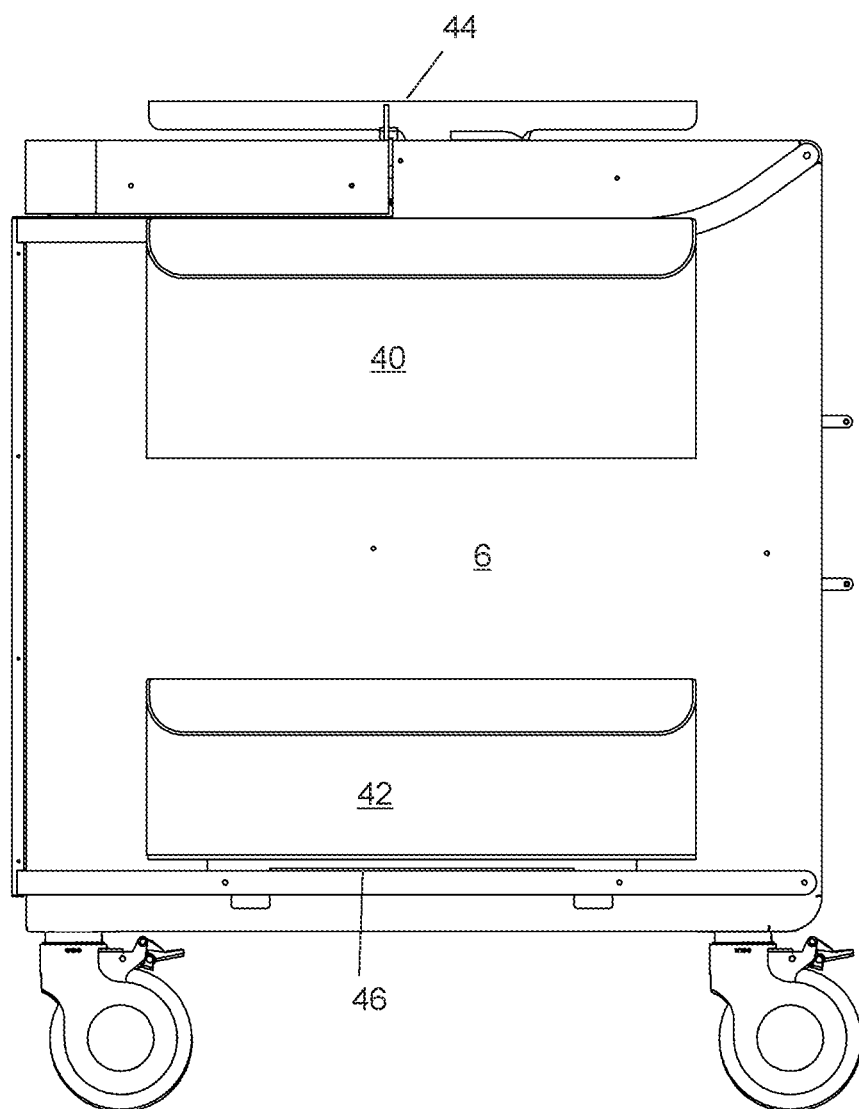
FIG. 25 shows a left, side, elevational view of the mobile serving cart in a stationary service configuration.
Figure 26:
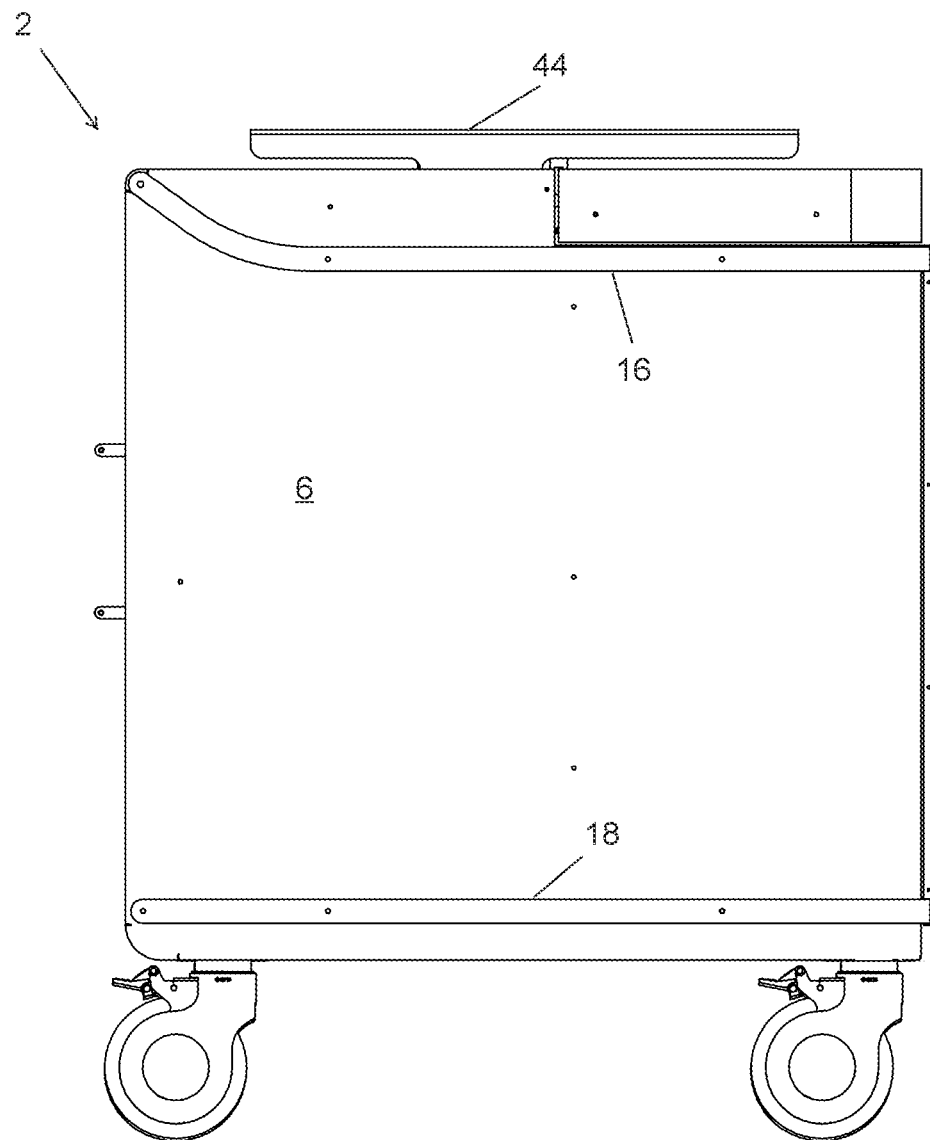
FIG. 26 is a right, side, elevational view of the mobile serving cart in a stationary service configuration.
Figure 27:
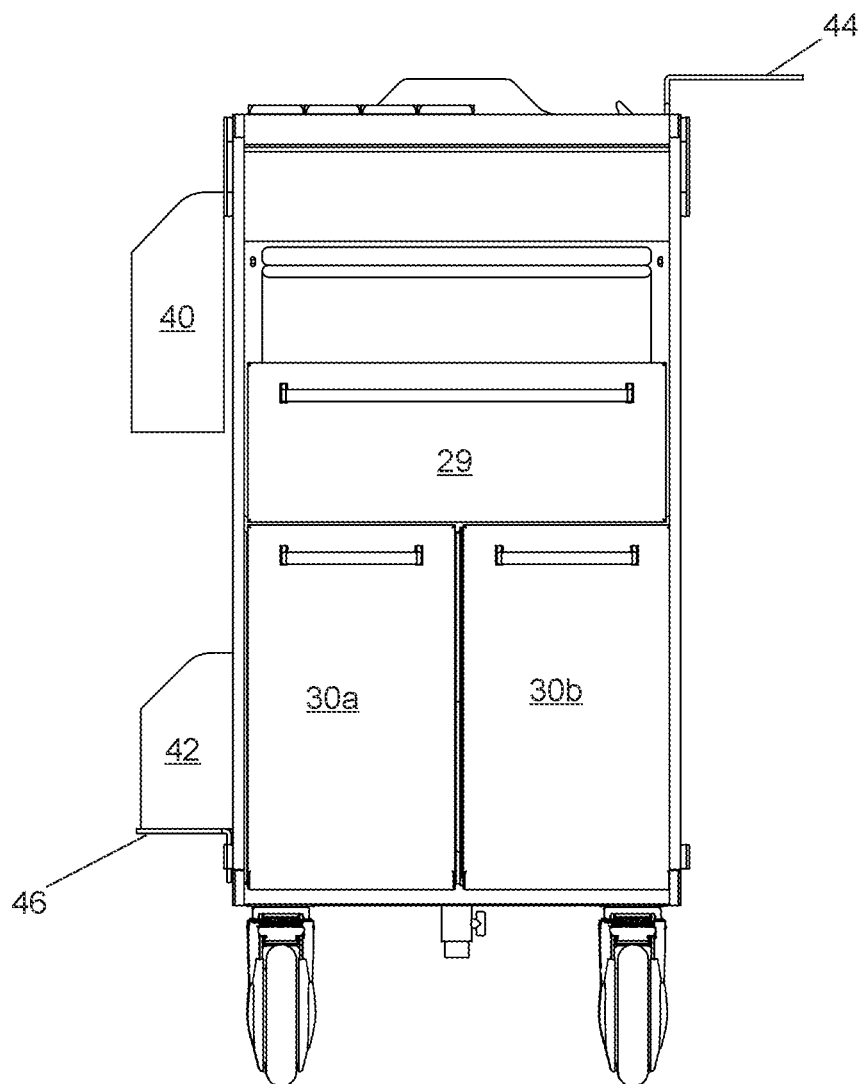
FIG. 27 is a back, elevational view of the mobile serving cart in a stationary service configuration.
Figure 28:
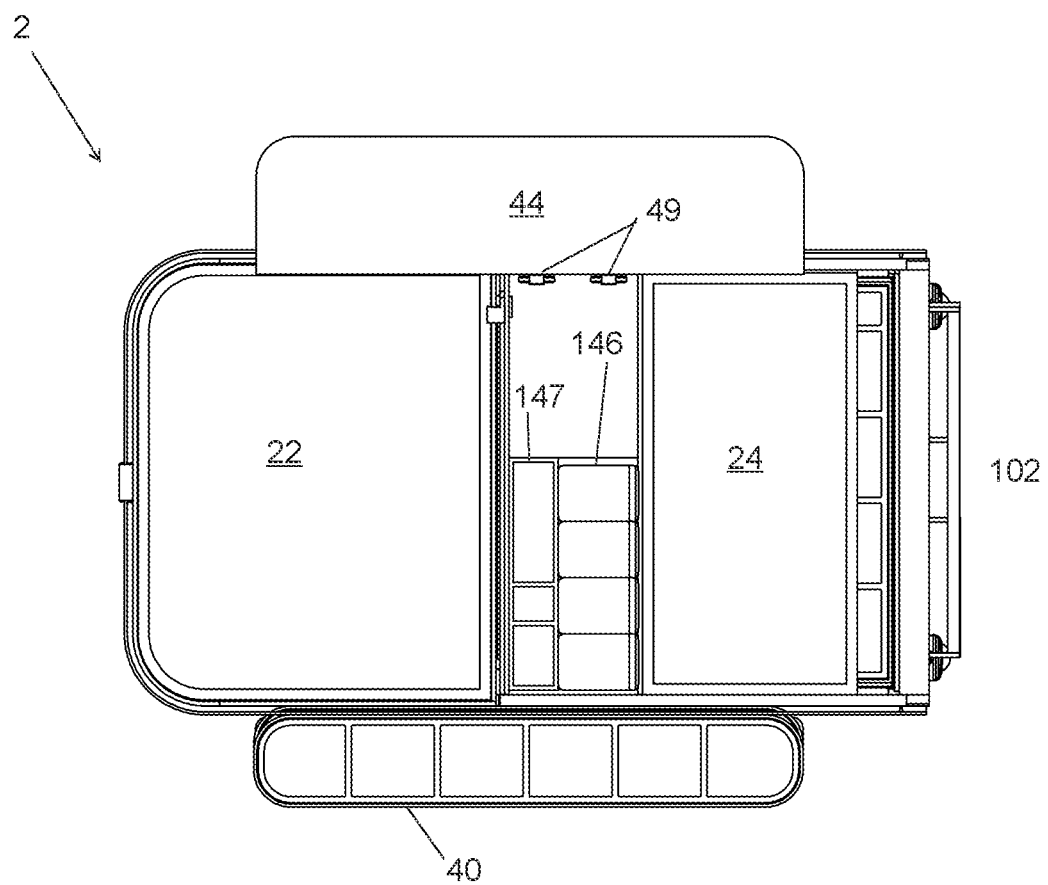
FIG. 28 shows a top, plan view of the mobile serving cart in a stationary service configuration.
Figure 29:
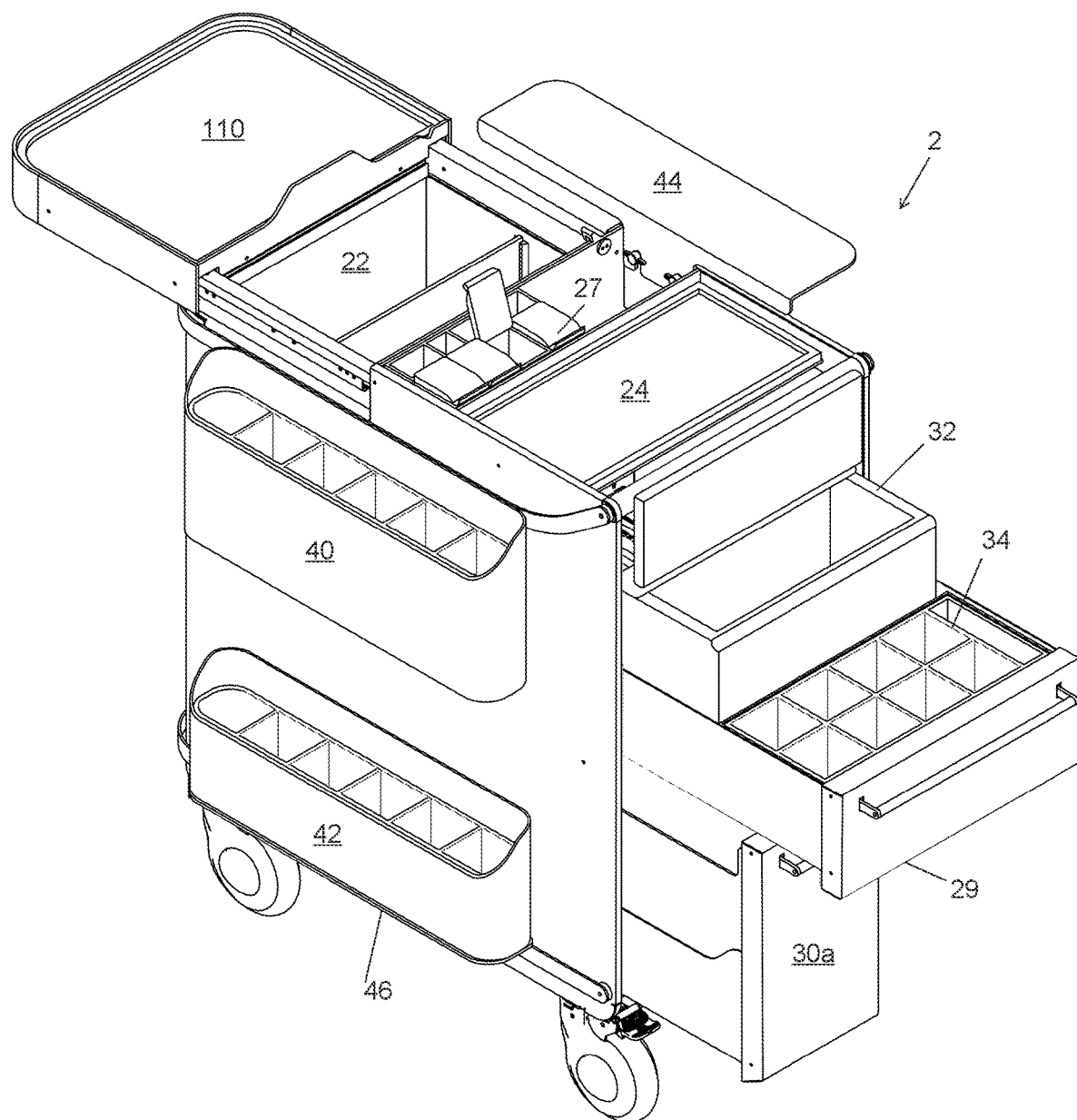
FIG. 29 shows an upper, back, left, perspective view of the mobile serving cart in a stationary service configuration with the top drawer, ice chest, bottom left drawer, cooler door, and a garnish tray open.
Figure 30:
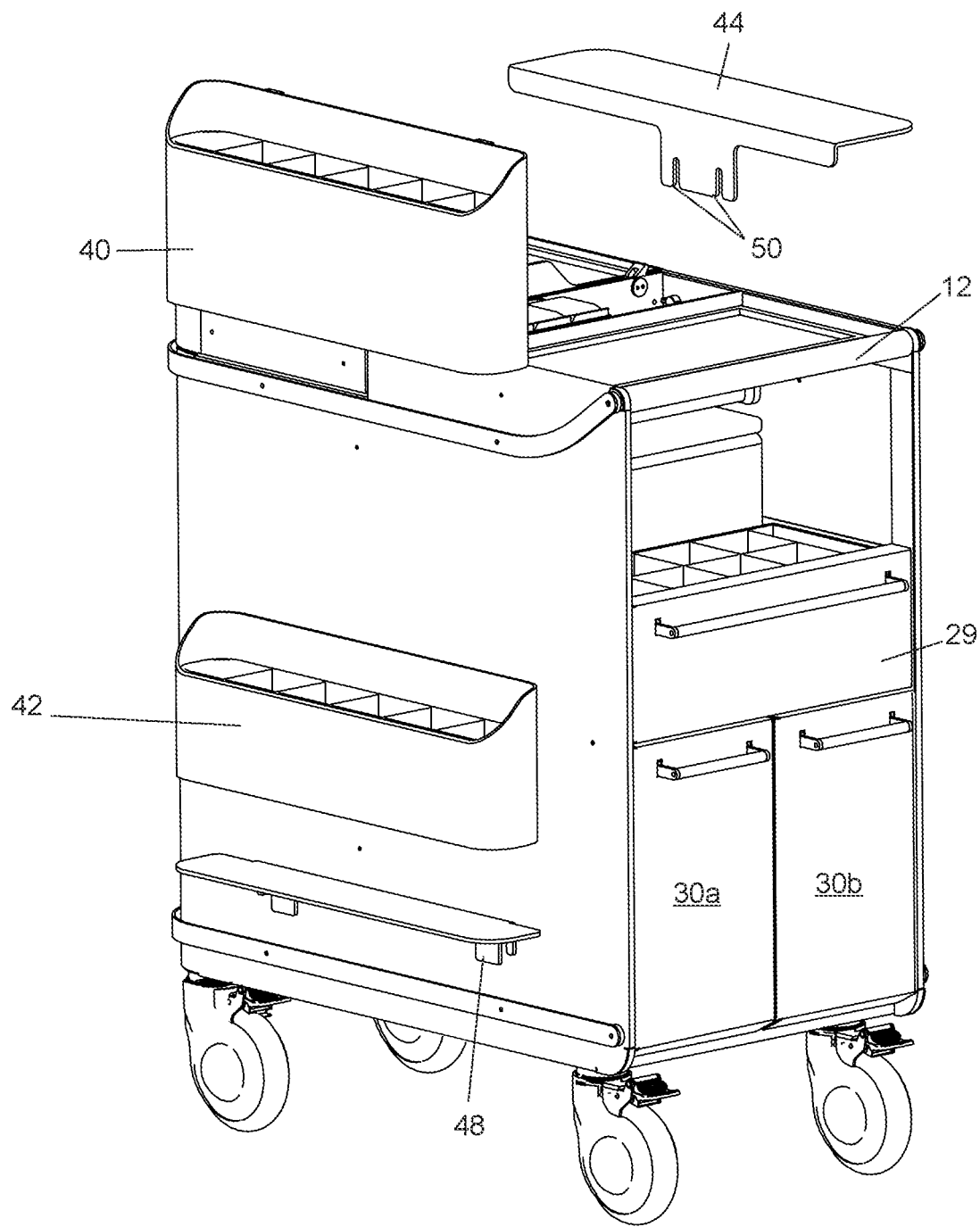
FIG. 30 shows an upper, back, left, perspective view of the mobile serving cart with a mountable bar top surface, upper mountable speed rail, lower mountable speed rail, and mountable shelf each exploded above a location to be mounted on the mobile serving cart.
Figure 31:
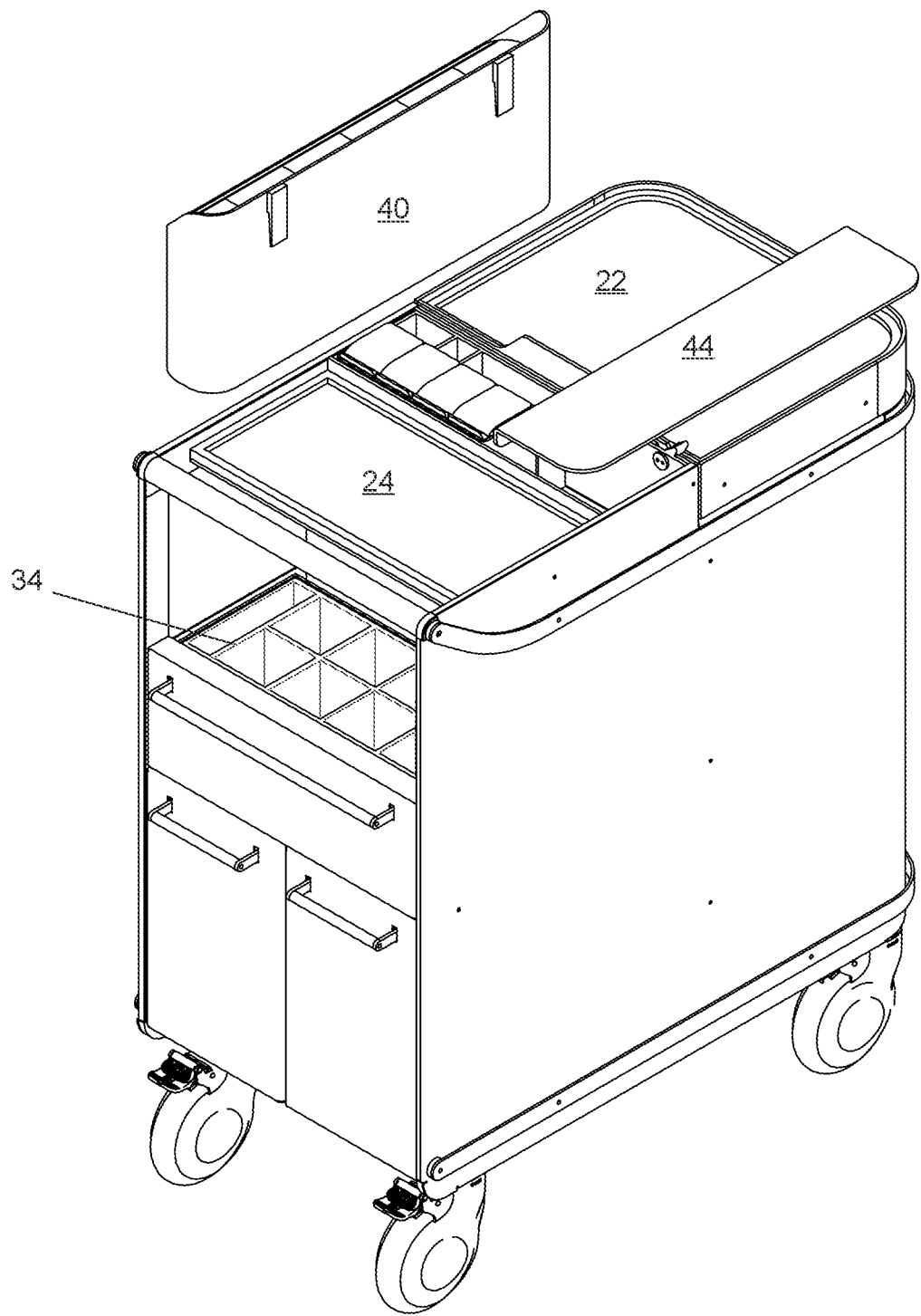
FIG. 31 is an upper, back, right, perspective view of the mobile serving cart with a mountable bar top surface and upper mountable speed rail each exploded above a location to be mounted on the mobile serving cart.
Figure 32:
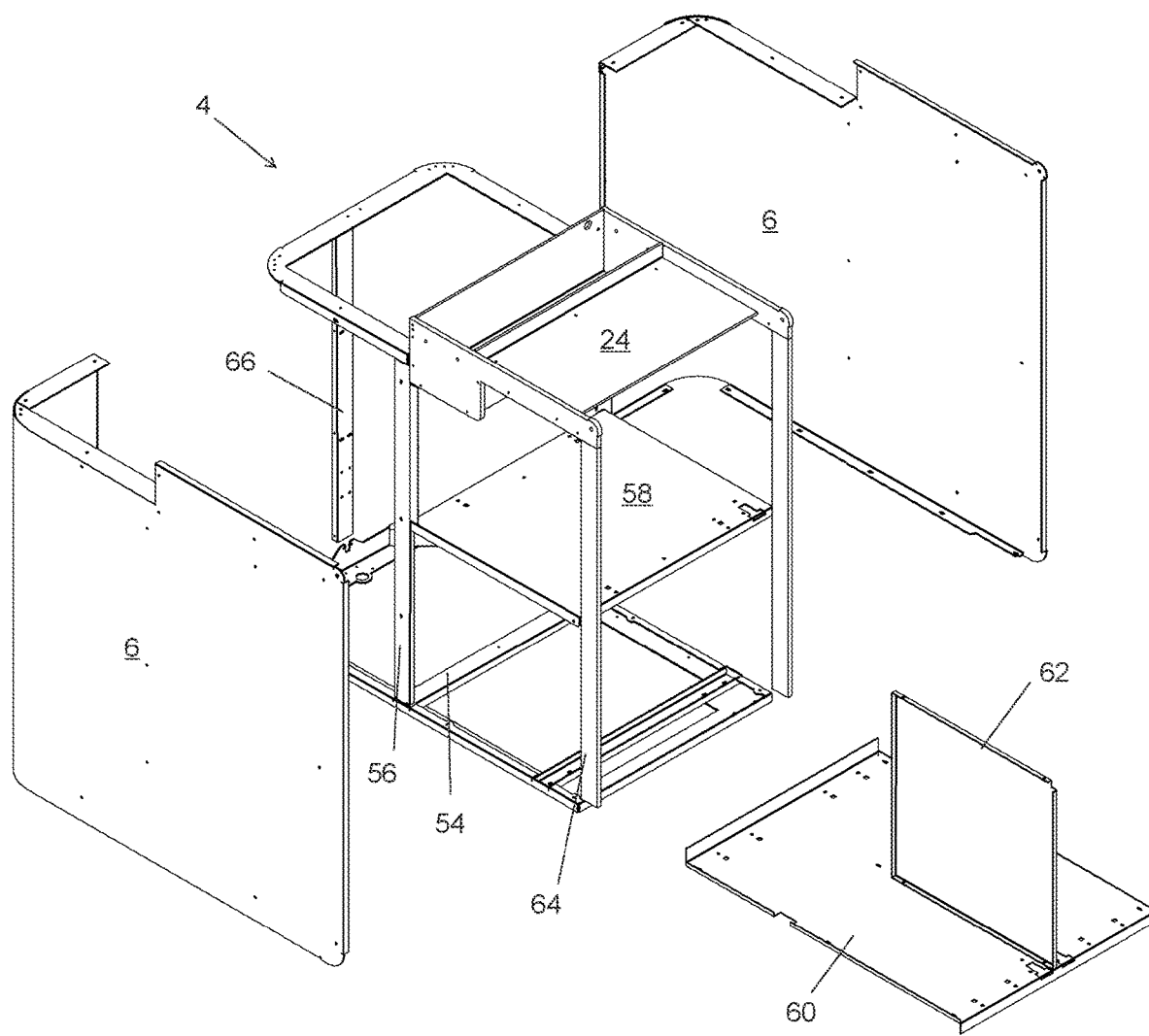
FIG. 32 is an upper, back, left, exploded perspective view of the frame and side panels making up the main housing of the mobile serving cart.
Figure 33:
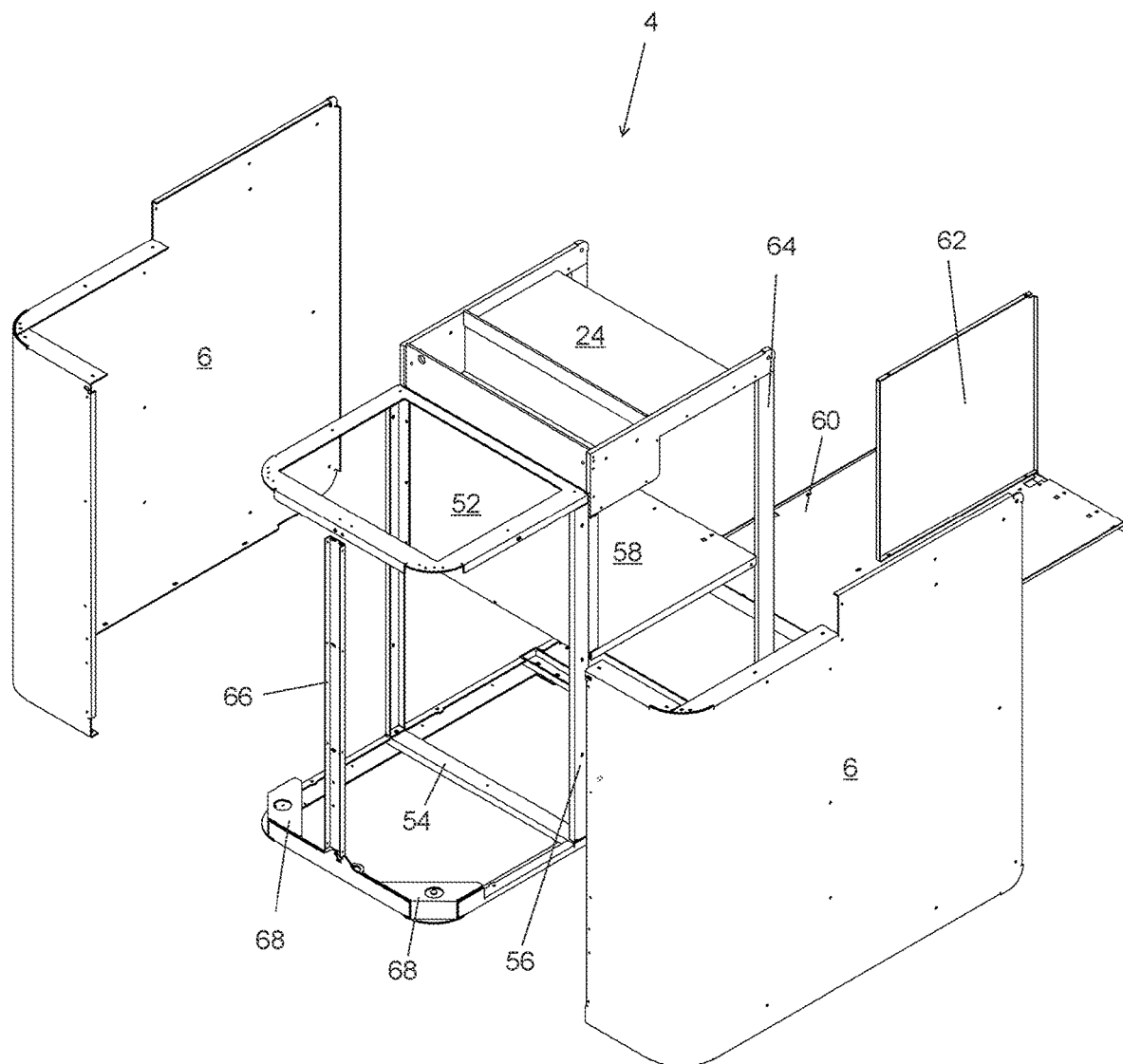
FIG. 33 is an upper, front, left, exploded perspective view of the frame and side panels making up the main housing of the mobile serving cart.
Figure 34:
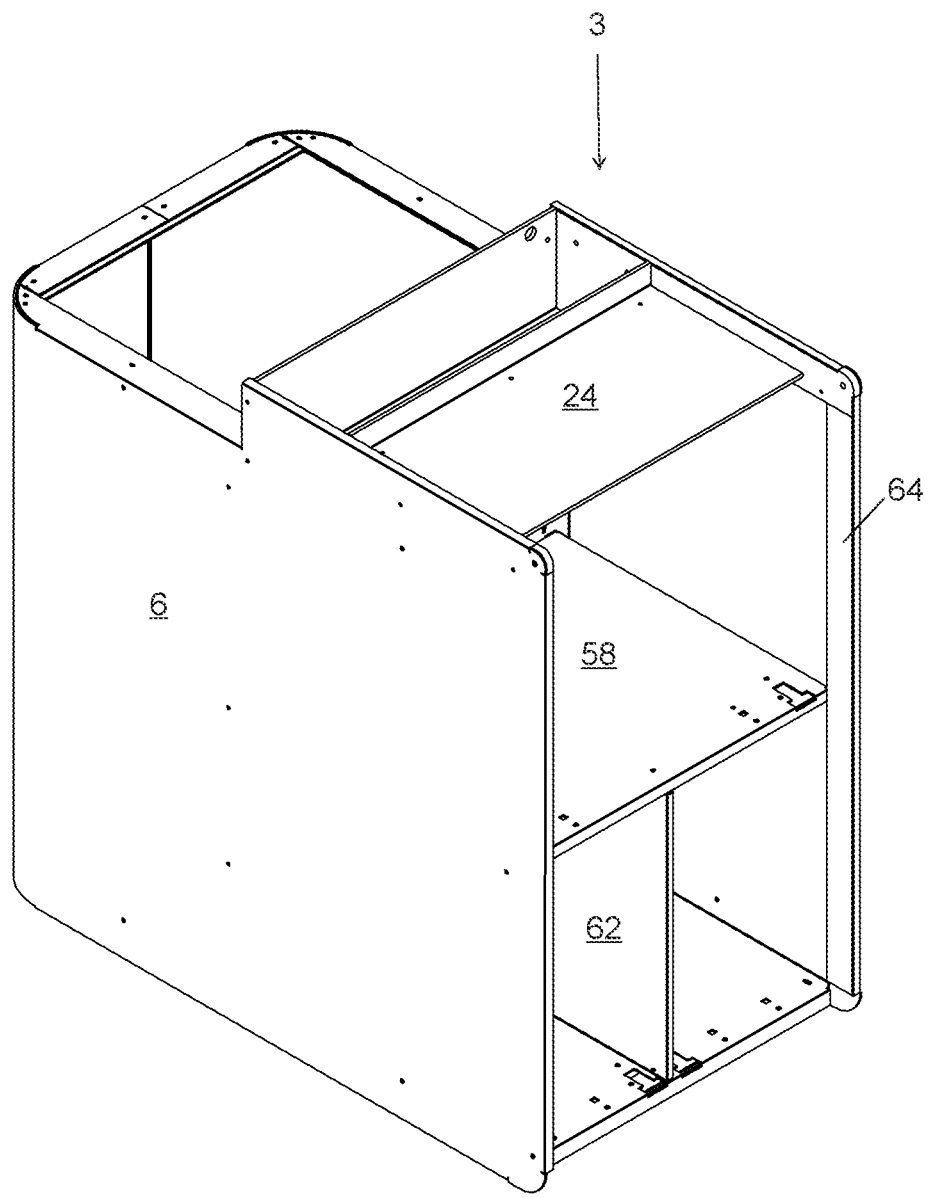
FIG. 34 is an upper, back, left, perspective view of the main housing of the mobile serving cart.
Figure 35:
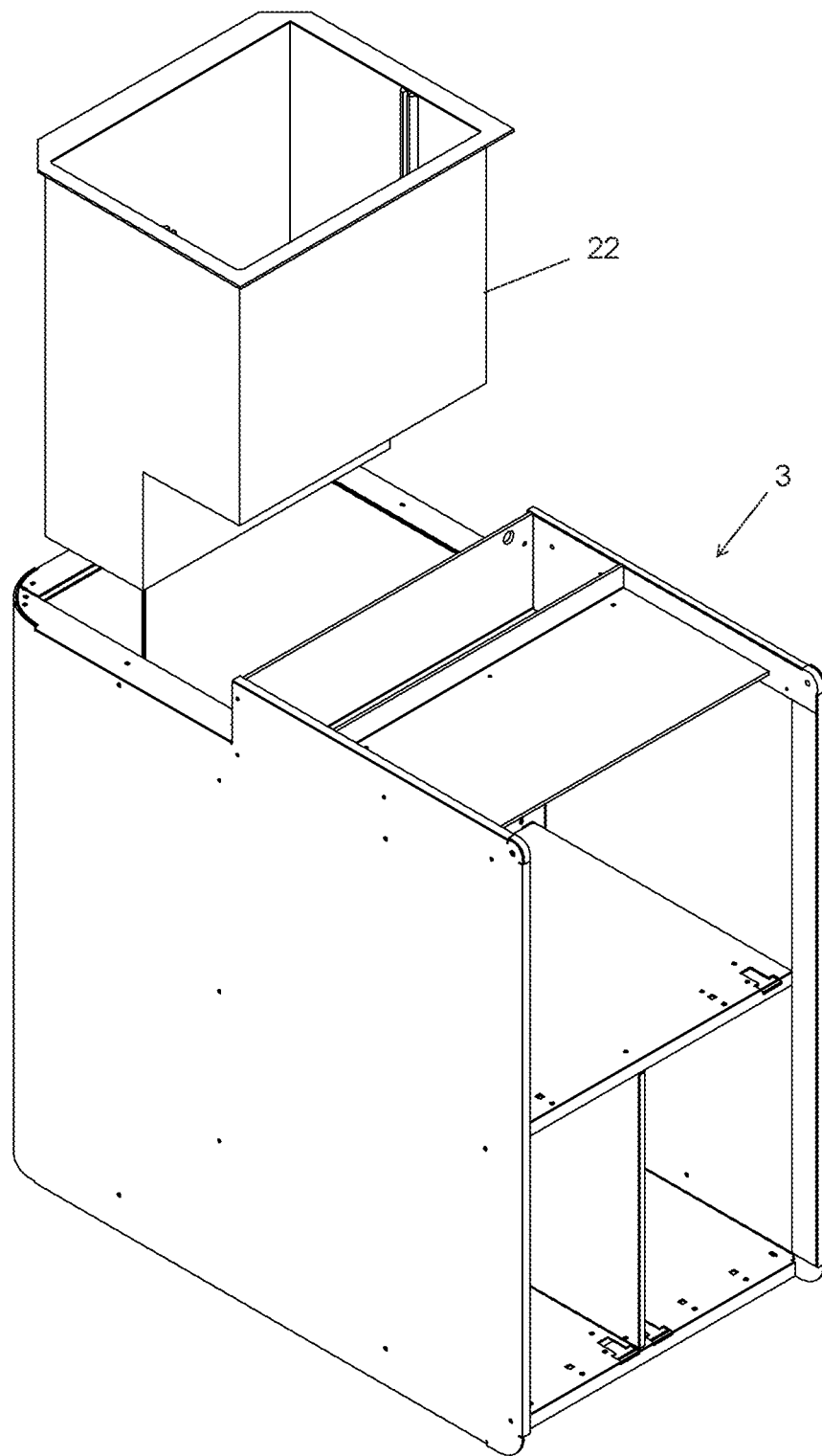
FIG. 35 shows an upper, back, left, perspective view of the main housing of the mobile serving cart with an exploded cooler component.
Figure 36:
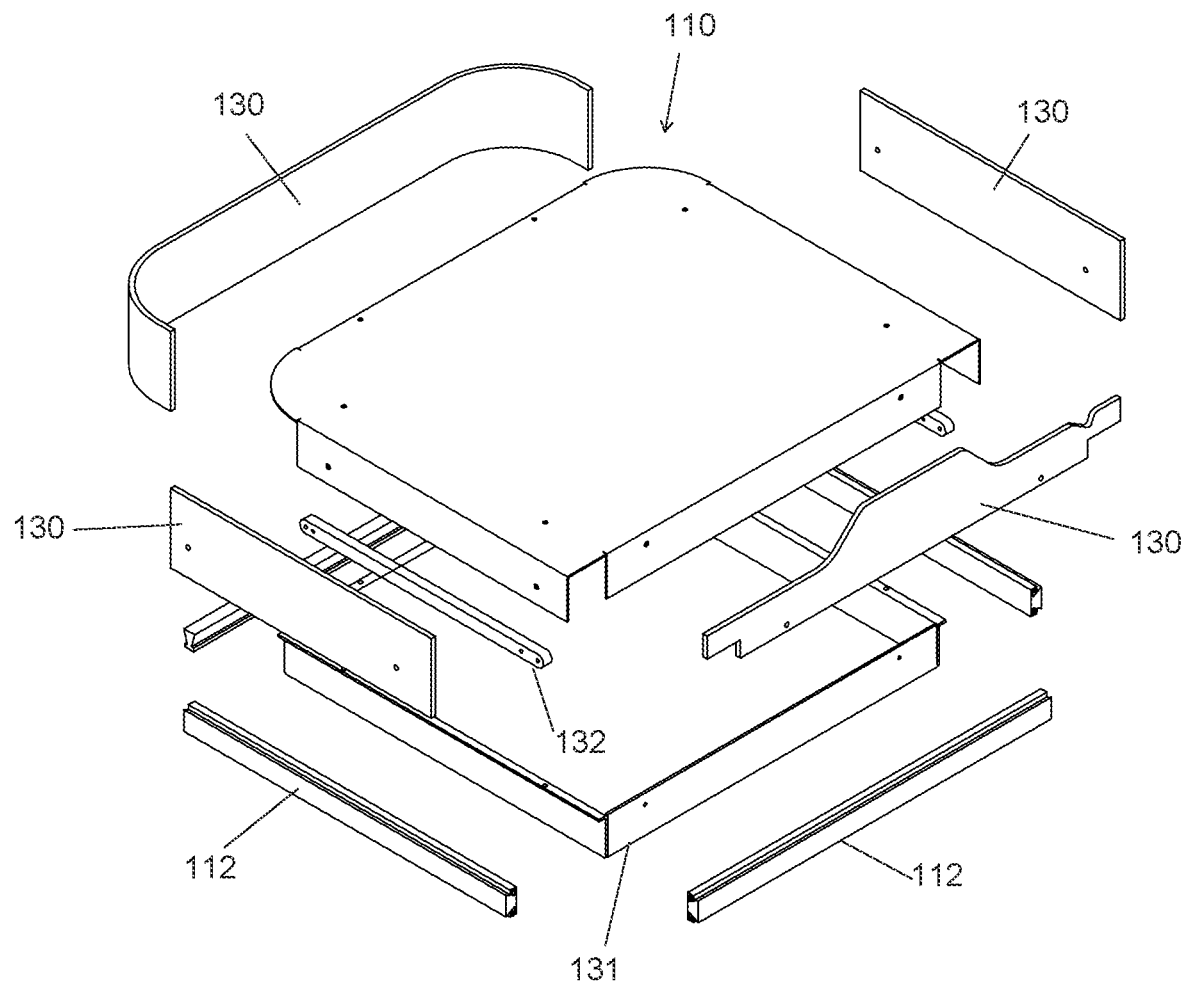
FIG. 36 shows an upper, back, left, exploded, perspective view of a cooler lid assembly of the mobile serving cart.
Figure 37:
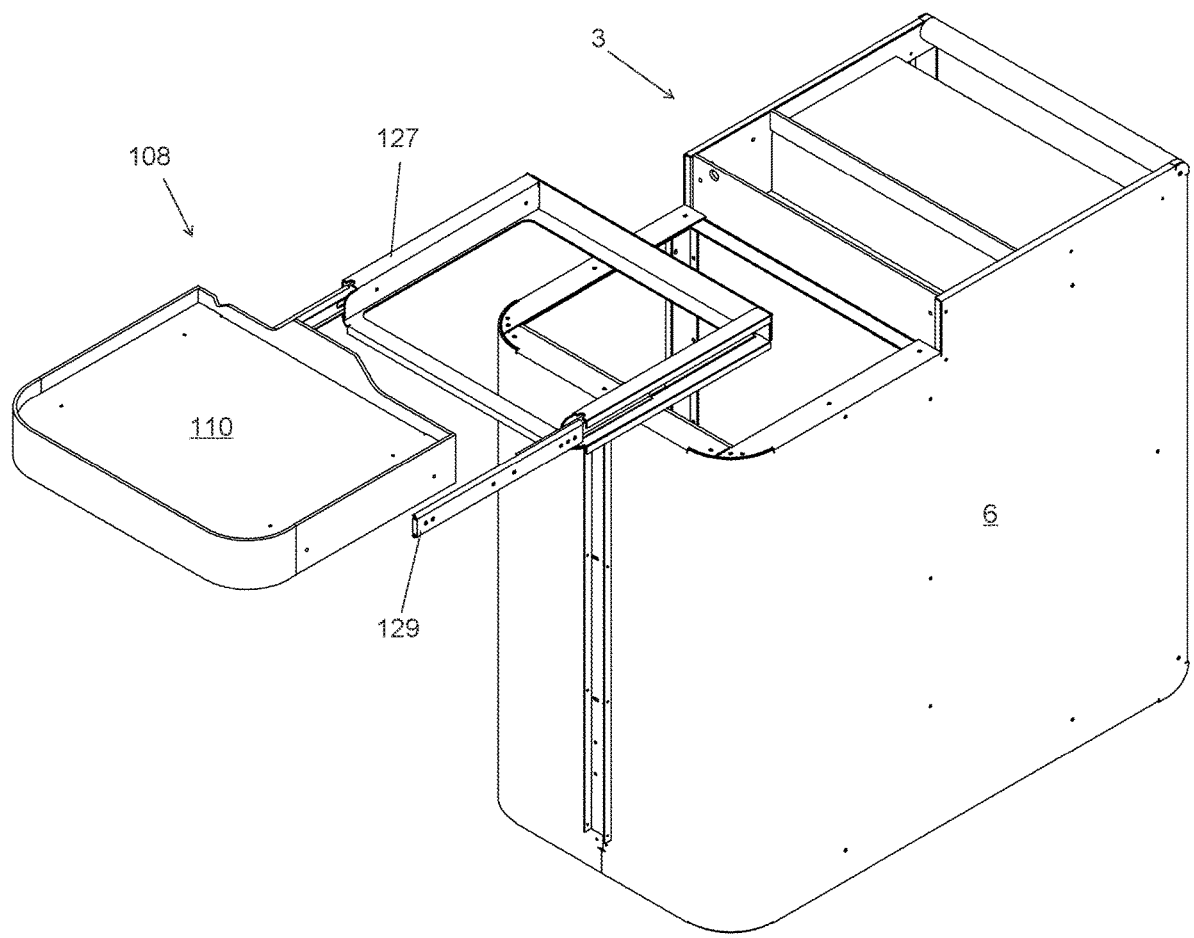
FIG. 37 is an upper, front, left, perspective view of a main housing of the mobile serving cart with an assembled cooler base but exploded cooler door and cooler slide assemblies.
Figure 38:
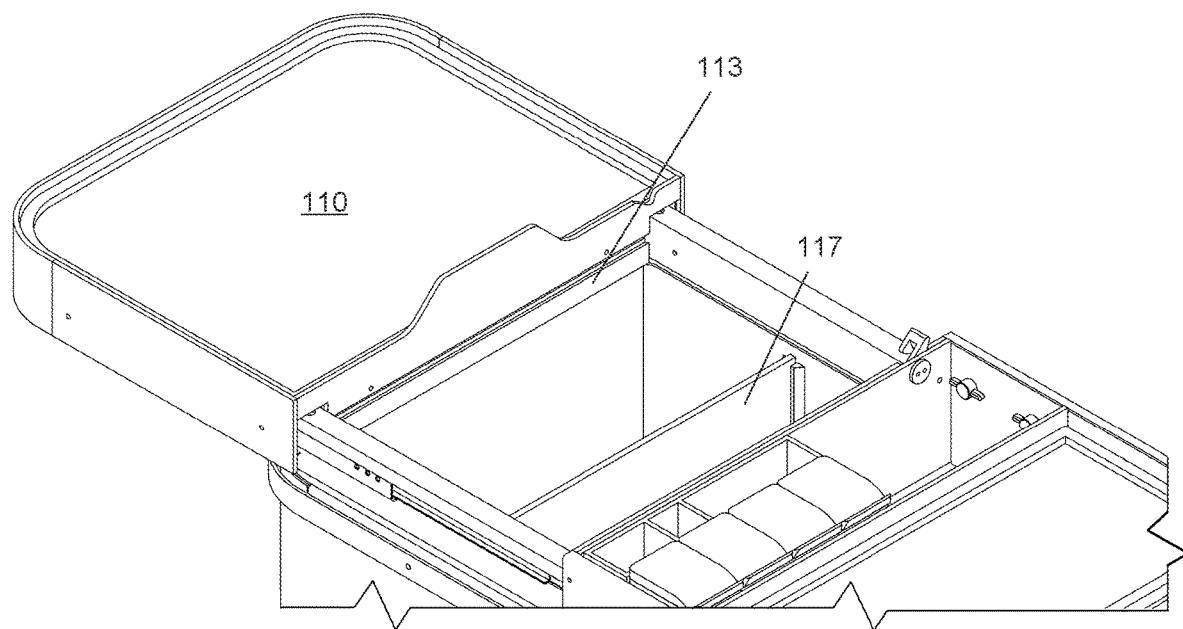
FIG. 38 is an enlarged, upper, back, left, perspective view of the cooler of the mobile serving cart with an open cooler door.
Figure 39:
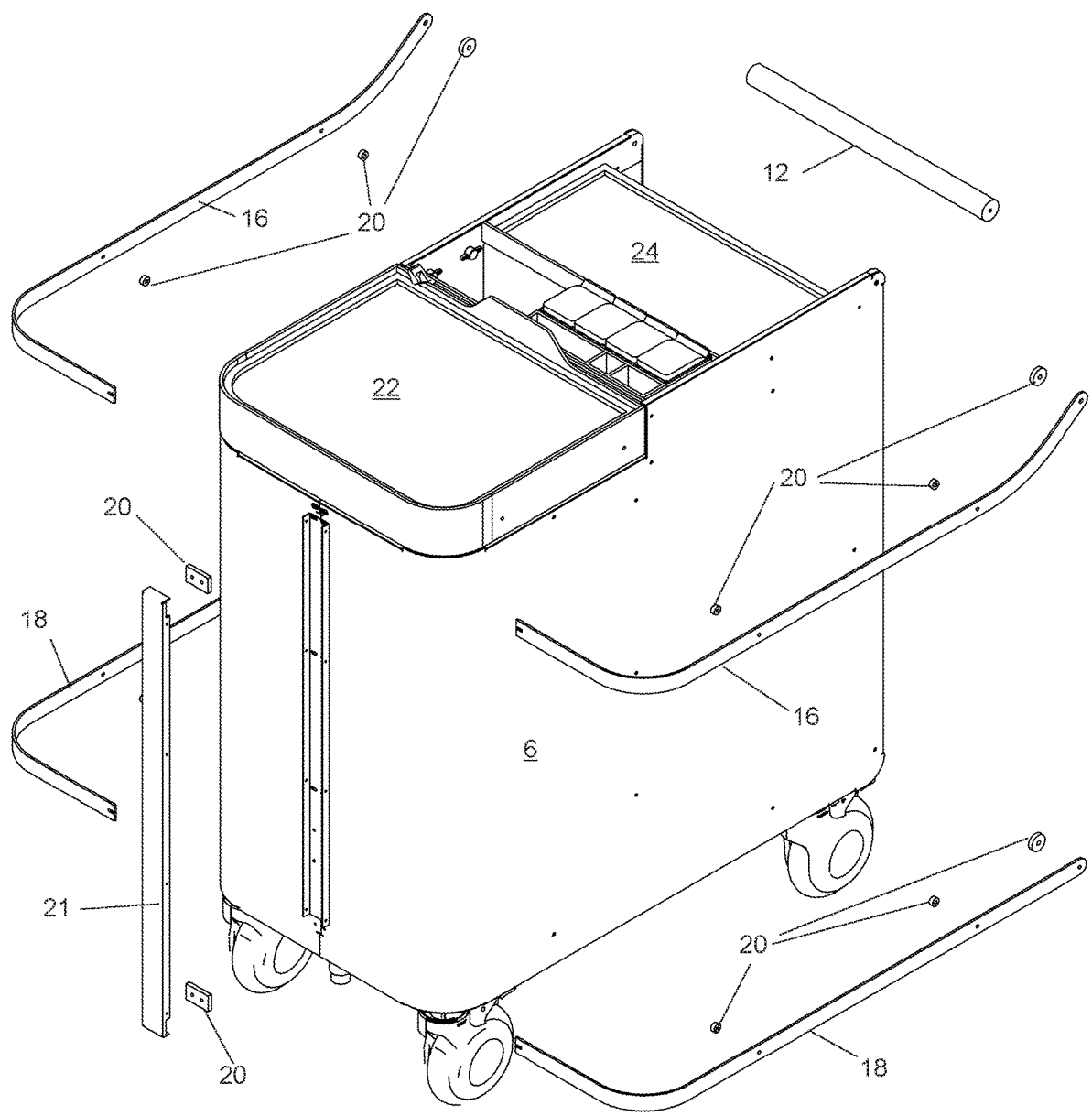
FIG. 39 shows an upper, front, left, perspective view of the mobile serving cart with exploded rail moldings, vertical molding, and handle.
Figure 40:
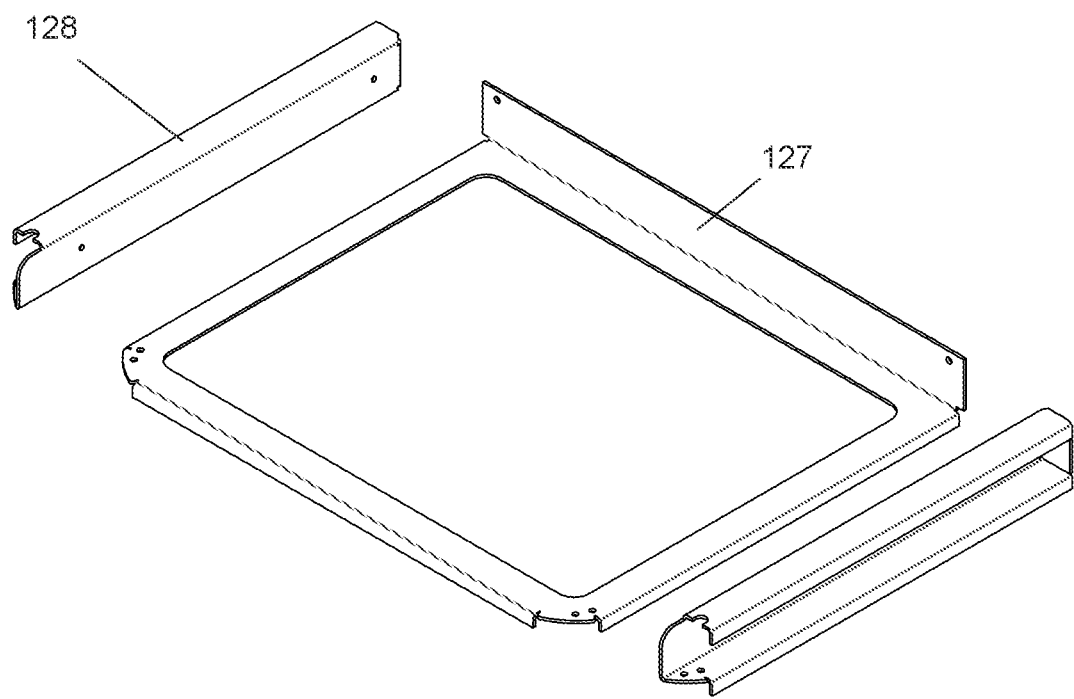
FIG. 40 is an upper, front, left, perspective view of a cooler slide assembly of the mobile serving cart.
Figure 41:
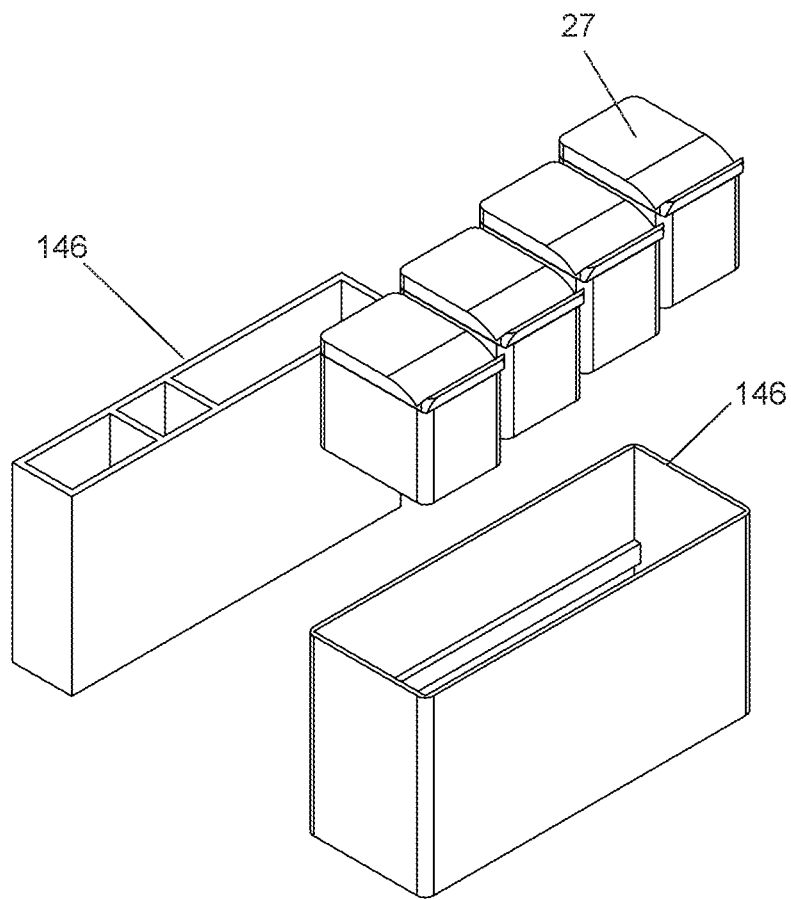
FIG. 41 is an upper, back, left, perspective view of a napkin and tool bin and a garnish tray holder with exploded garnish trays of the mobile serving cart.
Figure 42:
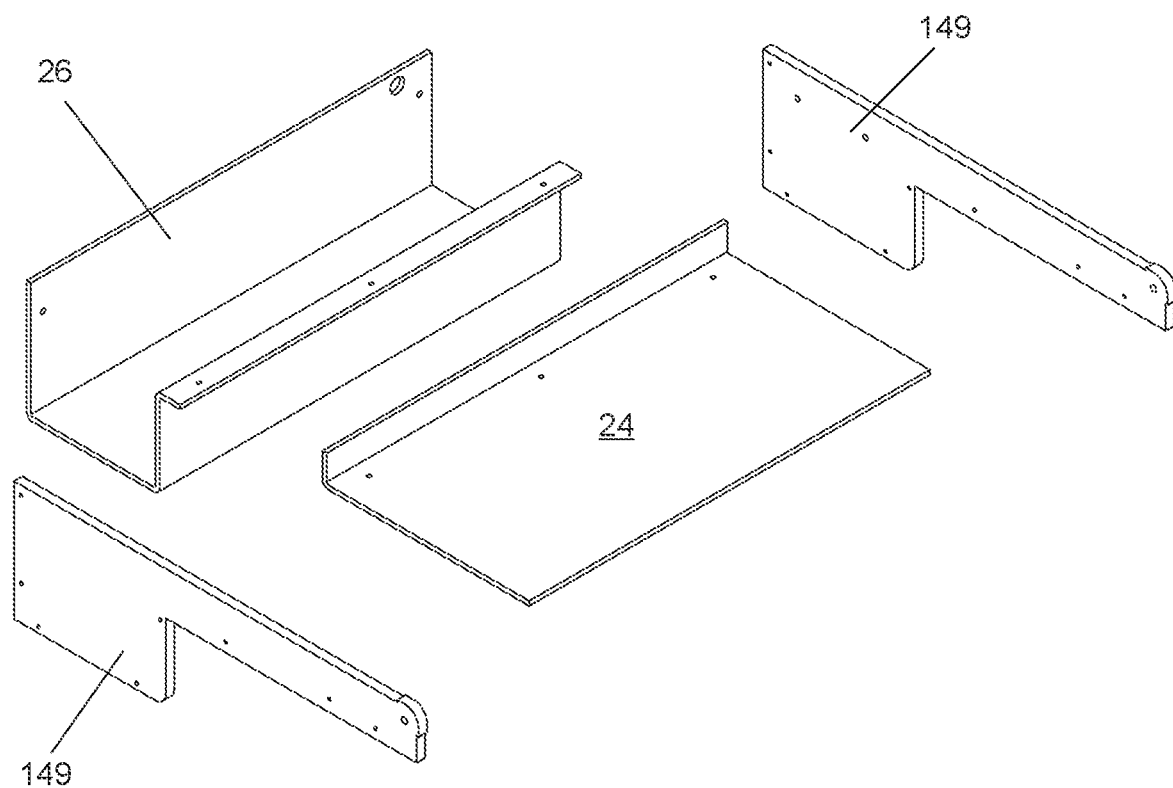
FIG. 42 shows an upper, back, left, exploded, perspective view of a garnish and tool holder cavity and work tray assembly of the mobile serving cart.
Figure 43:
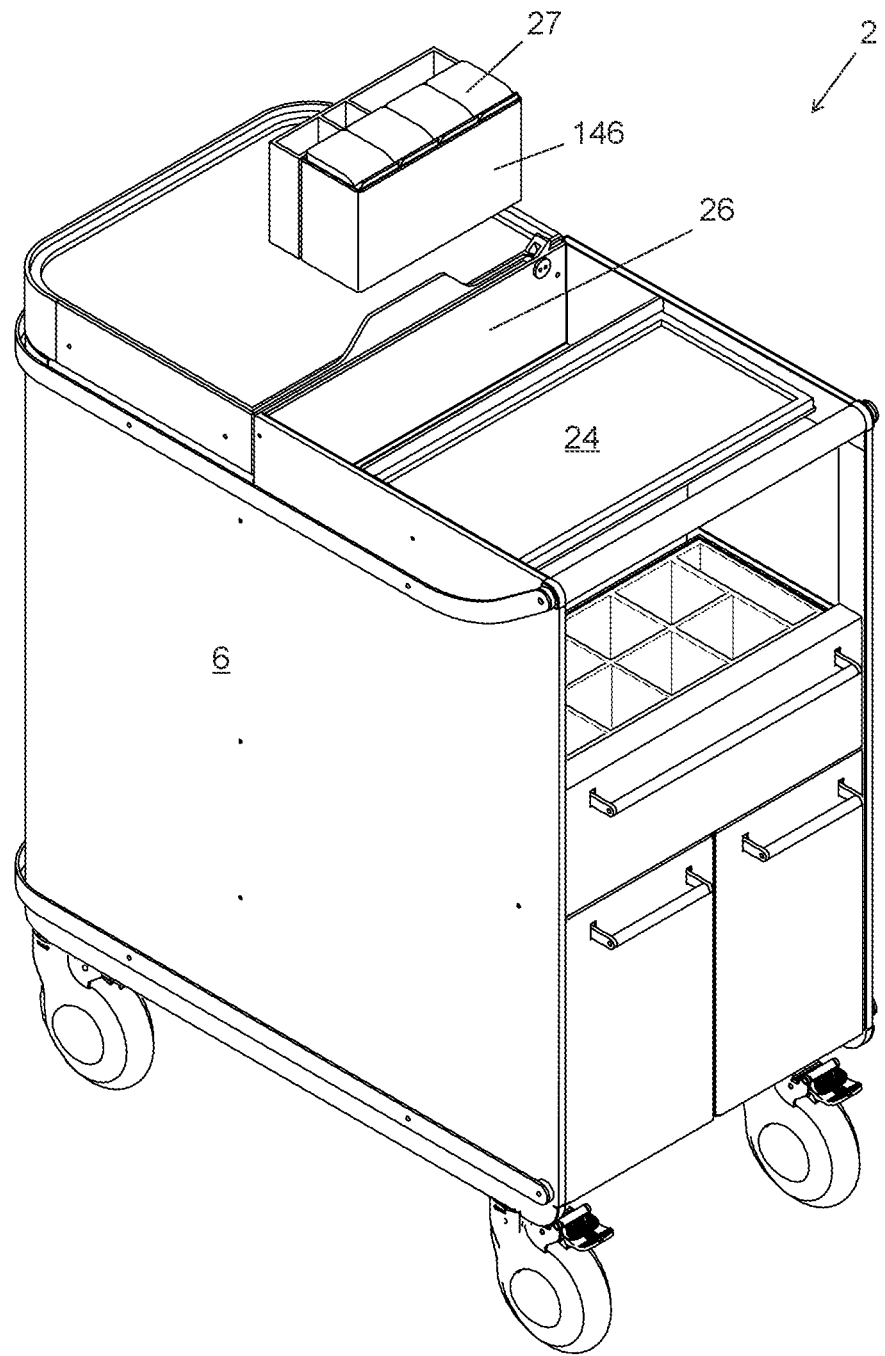
FIG. 43 is an upper, back, left, perspective view of the mobile serving cart with an exploded napkin and tool bin and an explode garnish tray holder.

As required, detailed aspects of the present invention are disclosed herein, however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words "inwardly" and "outwardly" refer to directions toward and away from, respectively, the geometric center of the aspect being described and designated parts thereof. Forwardly and rearwardly are generally in reference to the direction of travel, if appropriate. Additionally, anatomical terms are given their usual meanings. For example, proximal means closer to the trunk of the body, and distal means further from the trunk of the body. Said terminology will include the words specifically mentioned, derivatives thereof and words of similar meaning.

II. Preferred Embodiments

The present invention provides a compact, mobile serving cart 2 configured for efficient preparation and service of beverages, food, or other items to be served. In an exemplary embodiment of the present invention, the mobile serving cart 2 includes multiple configurations which are quick and easy to transition between depending on the desired use of the serving cart 2. Such multiple positions include, but are not limited to, a first, mobile, serve on the go configuration and a second, compact, stationary service configuration. The first, motive configuration accommodates effective service from the same side of the cart 2 that the user uses to push the cart 2, allowing the user to quickly drive the cart 2 to one location, prepare a drink or food item for a customer, serve the customer, and move on to a next location. The features of the mobile serving cart 2 in the mobile configuration make the present invention ideal for service tableside, poolside, in casinos, and other places where mobile bar service would be desirable. The second, stationary configuration of the mobile serving cart 2 allows for quick set-up of a full-service bar in a compact space. Such stationary configuration makes the present invention ideal for setting up a secondary bar, such as but not limited to at a crowded bar or restaurant, a sporting event, a convention, or another crowded event.

Referring to the drawings in more detail, FIGS. 1-21 show an exemplary embodiment of a mobile serving cart 2 of the present invention in a mobile service configuration. FIGS. 22-31 show the same embodiment of a mobile serving cart 2 of the present invention but in a stationary service configuration. FIGS. 32-45 show exploded views of this embodiment of the mobile serving cart 2 at various points in the production process.

The mobile serving cart 2 of the present invention includes a frame 4 and connected side panels 6 which form a main housing 3. In an exemplary embodiment, the frame 4 is made of steel and the side panels 6 are made of aluminum for a strong yet lightweight construction. However, alternative metals or other materials may be utilized in embodiments of the present invention. In a preferred embodiment, as shown in FIGS. 1-31, the side panels 6 are positioned substantially parallel to each other with an end of each panel 6 forming a curve along a given radius, meeting the other panel and forming a front panel positioned 90 degrees from the sides of the serving cart 2. The two panels 6 attached to the frame 4 form a front side and right and left sides of the main housing 3 of the mobile serving cart 2. Such curves in the side panels provide rounded, front corners 8 which result in added ease of maneuverability and added safety with the front corners not having sharp edges.

The mobile serving cart 2 further includes wheels 10, which support the cart 2 and accommodate movement of the cart 2, and a user handle 12 for directing such movement. In an exemplary embodiment, the mobile serving cart handle 12 is rear-mounted between the side panels 6 at an upper, back position of the cart 2. Preferably, the mobile serving cart push/pull handle 12 is round for a comfortable grip for the operator and is mounted approximately flush with the rear of the cart main housing 3 to not interfere with access to components and contents of the serving cart 2. However, alternative handle 12 positioning may also be utilized in embodiments of the present invention.

In an exemplary embodiment, the mobile serving cart wheels 10 are large, caster wheels configured for swiveling and include foot actuated levers 14 to brake wheel rotation and additional directional rotation. In a preferred embodiment, the mobile serving cart 2 includes both foot operated, full braking levers 14 and at least one foot operated lever 14 which locks the caster wheels 10 in a straight direction to make the cart 2 easy to roll in a forward or backward direction and around turns without drifting laterally to avoid collisions. However, alternatively, smaller and/or non-swiveling wheels may be utilized in embodiments of the mobile serving cart 2.

In the embodiment shown in FIGS. 1-31, the mobile serving cart 2 includes upper 16 and lower rail moldings 18 which extend along the sides and front of the cart 2. These rail moldings 16, 18 are spaced out from the cart side panels 6 a distance with spacer pieces 20 and serve multiple purposes. In the mobile, serve on the go configuration of the present invention, the rail moldings 16, 18 are configured to act as bumpers when a user moves the serving cart 2 around tables, crowds, and other objects. In a stationary configuration, the rail moldings 16, 18 are configured to accommodate mounting various service industry tools and/or objects from the moldings 16, 18. Preferably, the rail moldings 16, 18 also include rounded front corners 19, matching up with the rounded front corners 8 of the main housing 3. In embodiments, the rail moldings 16, 18 may be made of metal, wood, durable plastic, or another material configured for mounting objects. Alternative embodiments of the present invention may include one rail molding, rather than two, or more than two rail moldings, as desired.

In an exemplary embodiment of the present invention, the mobile serving cart 2 further includes a cooler assembly 22; a designated work tray assembly 24; a garnish and tool holder assembly 26; and driver-side, sliding drawers 28, 30a, 30b openable toward a user and configured for housing various ingredients, an ice chest 32, service tools, glassware, and other objects desirable for service of beverages, food, etc. These components of the mobile serving cart 2 of the present invention are arranged in such a way to maximize the usable space in the compact design. The lack of wasted space in the mobile serving cart 2 design is best illustrated by the cross-sectional views in FIGS. 8-19.

The drawers 28, 30a, 30b of the present invention form a back side of the mobile serving cart 2. In an exemplary embodiment of the present invention, the cart drawers 28, 30a, 30b house removable caddies configured for holding bottles, glassware, bar tools, supplies, etc. In an exemplary embodiment, below the handle 12 on the rear end of the cart is a top drawer 28 which is approximately the full width of the mobile serving cart 2 and has a drawer panel 29 approximately half the height of a standard one-liter bottle. Between the top drawer panel 29 and the top of the serving cart 2 is an opening into the top drawer 28 large enough to remove and replace a standard one-liter bottle to and from the top drawer 28. The top drawer 28 extends to a vertical midplane 52 of the mobile serving cart 2 and is configured for housing a removable caddy 34 having two rows of compartments for one-liter bottles and/or glassware, forming an upper speed rail. Behind the upper speed rail 34 in the top drawer 28, positioned closer to the front of the serving cart 2, is an ice chest 32.

While the opening into the top of the top drawer 28 allows removal of bottles and glasses without opening the drawer 28, in the embodiment shown in FIGS. 1-31, opening the top drawer 28 halfway allows further access to the eight-compartment removable caddy 34 for storing standard beverage bottles and glassware. Preferably, the speed rail caddy 34 is equipped with padded holders to prevent glass from breaking, but other embodiments include caddies with no holder padding. Opening the top drawer 28 all the way or nearly all the way also allows access to the ice chest 32. When the top drawer 28 is closed, the ice chest 32 is configured to nest just below a top central compartment or cavity 26 for garnishes and tools, and the ice chest 32 is removable.

In an exemplary embodiment, two adjacent drawers 30a, 30b are located below the top drawer 28. In a preferred embodiment, the bottom drawers 30a, 30b are equal in width and extend into the cart approximately 50 percent further toward the front of the cart 2 than the top drawer 28. One of the bottom drawers 30a is configured for housing a removable trash can 36 and a removable storage bin 38 for extra bartending supplies or materials. The other bottom drawer 30b is configured for housing mountable components of the mobile serving cart 2 for the stationary service configuration. Such mountable components include two elongated, removable caddies 40, 42 configured for forming mountable speed rails; a mountable bar top 44; and a mountable shelf 46.

Preferably, the two removable caddies 40, 42 housed in one of the bottom shelves 30b are long and narrow, configured for housing one row of standard, one-liter bottles and for providing mountable bartending speed rails for attachment to the mobile serving cart rail moldings 16, 18 in the stationary service configuration via mounting clips 48. In an exemplary embodiment, the mountable speed rails include an upper 40 and lower mountable speed rail 42, the upper rail 40 being deeper than the lower rail 42. In an exemplary embodiment, a mountable shelf 46 is configured to be mounted with clips 48 onto the serving cart lower rail molding 18, and the lower mountable speed rail 42 sits on the mountable shelf 46. Such an arrangement suspends the speed rail 42 above the ground in a desirable, usable position. This embodiment further includes a stowable bar top attachment 44 configured for being mounted on the serving cart 2 in the stationary configuration to give customers a space to place their drinks and/or other belongings. Preferably, the bar top attachment 44 includes grooves 50 configured for mating with wingnuts or knobs 49 located near the top of the customer-facing side panel 6 of the cart 2 in the stationary service configuration and mounting at approximately bar height. Embodiments of the present invention may further include additional mountable shelves and/or additional mountable features desirable for serving beverages, food, or other items.

Figure 44:
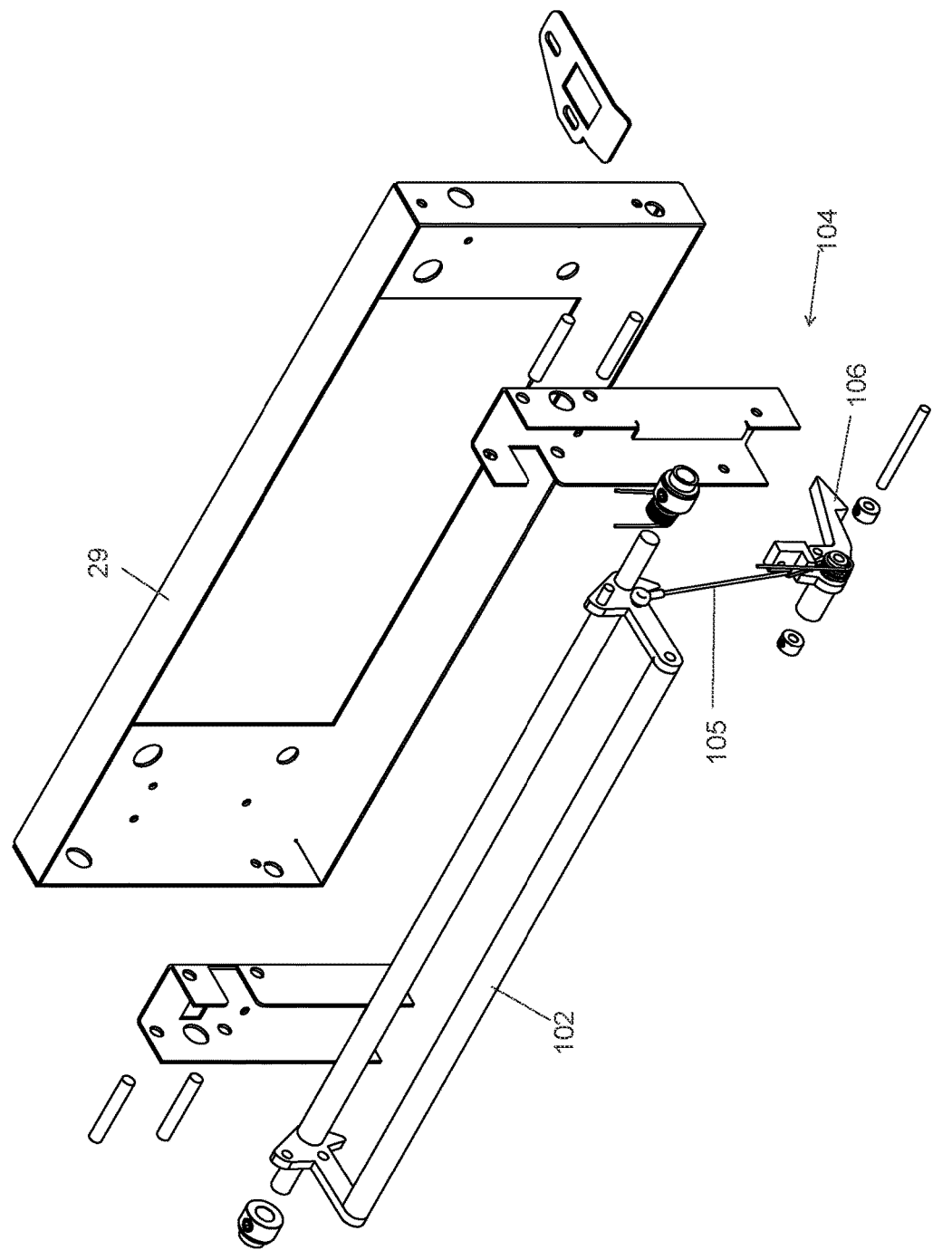
FIG. 44 is an upper, back, right, exploded, perspective view of a drawer locking mechanism of the mobile serving cart.
Figure 45:
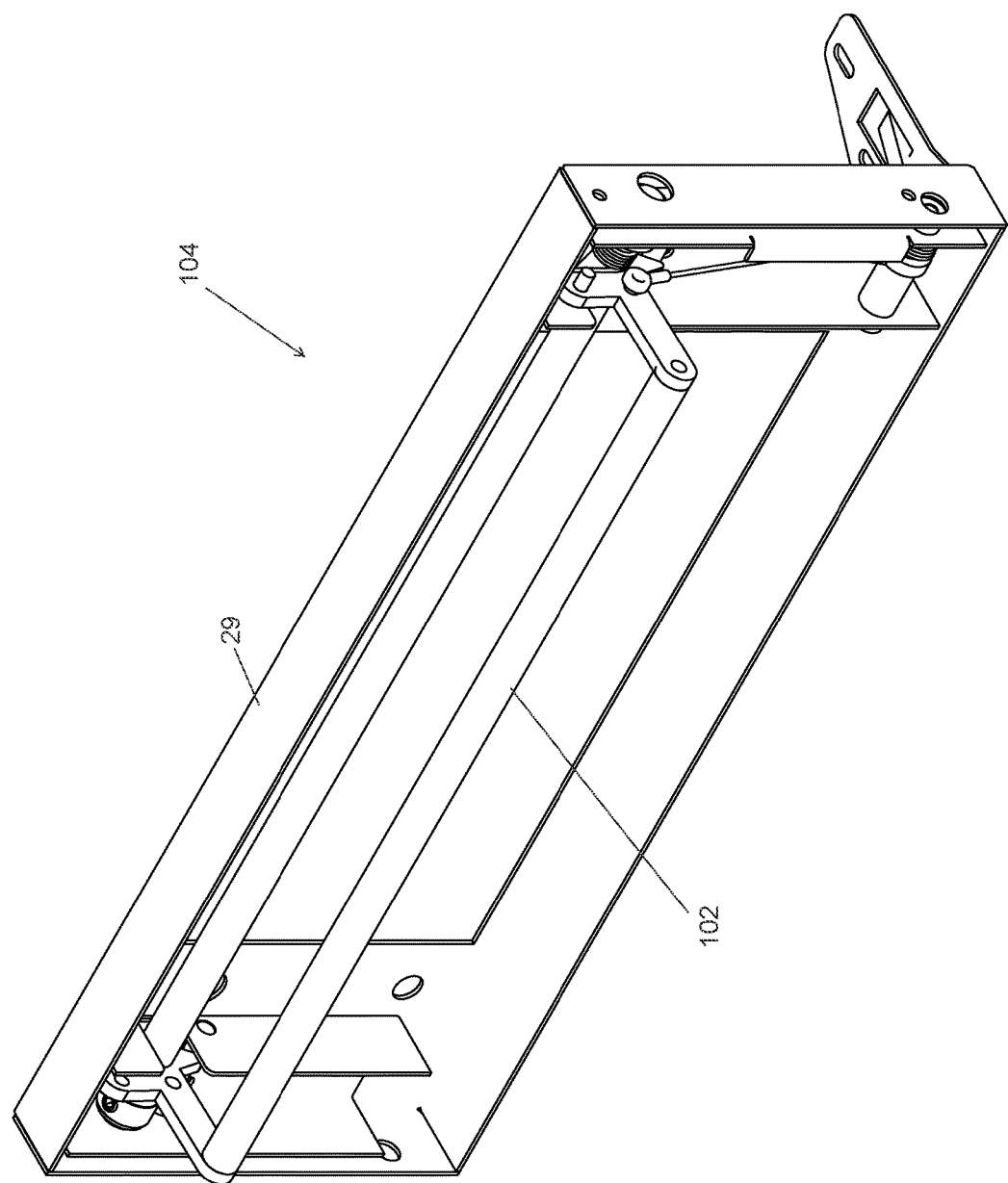
FIG. 45 shows an upper, back, right, perspective view of a drawer locking mechanism of the mobile serving cart.

In an exemplary embodiment, each of the drawers 28, 30a, 30b has a drawer handle 102 and an associated locking mechanism 104 for keeping the drawer 28, 30a, 30b in closed position when the mobile serving device 2 is in motion. When the mobile serving cart 2 of the present invention is moving, whether on flat surfaces, uneven surfaces, bumps, ramps, etc., the drawers 28, 30a, 30b need to be locked primarily for safety reasons. Friction latches and magnets are prone to failure, so a latch that is secure and easy to disengage for quick operation is desirable. FIGS. 44-45 show an exploded view of a drawer latch 104 of an embodiment of the present invention, which comprises a unique spring, sprocket, and cable locking mechanism. The drawer latches 106 in this embodiment are spring biased downward, keeping the latch 106 in a locking position. To open, a user lifts up the drawer handle 102, which rotates the locking mechanism 104 and pulls a cable 105 which releases the latch 106. In this embodiment, simply pulling up a small amount on the handle 102 disengages the lock 106 and allows access to the drawer 28, 30a, 30b. Closing the drawer 28, 30a, 30b then automatically reengages the lock 104. Alternatively, a locking mechanism utilizing locking buttons or levers to prevent the drawers 28, 30a, 30b from inadvertently sliding open when traveling over bumps or on inclines may also be used. In such embodiments, pushing the button or pulling the lever near the handle would release a drawer 28, 30a, 30b and allow it to slide open. Similarly, closing the drawer 28, 30a, 30b would automatically re-engage a spring-loaded locking mechanism to prevent the drawer 28, 30a, 30b from sliding open without operating the mechanism again. Alternative drawer arrangements and configurations may also be used in embodiments of the present invention.

A top, front portion of the mobile serving cart 2 of the present invention houses an insulated cooler 22 accessed with an insulated door 110 and associated handle 111. Insulation 115 within the cooler 22 and cooler door 110 provides protection from heat transfer to the contents of the cooler 22. In a preferred embodiment, the cooler 22 includes a sliding cooler door 110, configured for sliding outward toward the front of the mobile serving cart 2. In a preferred embodiment, the cooler door 110 provides a secondary work space and slides to allow access to the inside of the cooler 22. In an exemplary embodiment, the cooler door assembly 108 includes seals 112 along its cooler door sliding mounts 129 and includes a magnetic seal 113 at the front of the cooler door 110 similar to a refrigerator door for efficient prevention of heat transfer into the cooler 22. While the magnetic seal 113 is sufficient for keeping the cooler door 110 closed in most circumstances, in a preferred embodiment, the cooler 22 is further equipped with a latch lock 114 for totally locking the cooler door 110 when the cart 2 is being moved.

In a preferred embodiment of the present invention, the mobile serving cart molded cooler 22 includes a stair step 116 design to allow for maximum use of space within the structure of the cart 22. An optional, removable divider 117 accommodates separation of the spaces within the cooler 22 with differing depths. The upper area is ideal for isolating bottles so they do not intermingle with ice in the adjacent cavity, which allows for quicker handling of the bottles in the cooler 22. In an exemplary embodiment, a small hole in the divider 117 allows excess water from melted ice to drain into the lower portion of the cooler 22. A drain 120 at the bottom of the cooler 22 runs to the bottom of the cart 2 via a hose 122 and a valve 121 with a release lever so that the cooler 22 may be easily drained.

In an alternative embodiment, the cooler door may be hinged rather than a sliding door. In such a hinged cooler door arrangement, the door may be configured for automatically holding this position when rotated past a vertical position. Alternatively, the door can swing 180 degrees and become a work or serving surface.

In further alternative embodiments, the empty space below the cooler 22 may contain a battery and associated electronic components to power a refrigeration system for the cooler, eliminating the need for ice to provide cooling. Alternatively, a heating system could also be utilized to keep beverages or food warm in certain applications.

In an exemplary embodiment, at the rear of the top portion of the mobile serving cart 2 is a designated work surface 24 for making cocktails and beverages. Preferably, the work surface 24 is equipped with a rubber drain mat for quick clean up. At the top of the cart between the work surface 24 and the cooler door 110 forms an open storage compartment or cavity 26 configured for receiving and housing miscellaneous items, such as but not limited to garnishes, napkins, bar tools, utensils, and glassware. In alternative embodiments, this compartment 26 could have a door. In an exemplary embodiment, the work surface 24, cooler 22, and central storage area 26 are all configured for being accessible from the standing position at the rear or operator end of the cart 2 and from a stationary position from the side of the cart 2 with mounted speed rails 40, 42.

In an exemplary embodiment, the mobile serving cart 2 further includes a light on its front panel so the operator can easily see obstacles in dark or low light conditions. Additionally, a pocket underneath moldings 16, 18, 21 can accept an LED light strip or other type of lighting so that light can shine on the side panels 6 or the ground.

The frame 4 of the present invention is made up of a chassis having chassis supports 54 arranged in a rectangular shape and attached to four vertical supports 56. A lower midplane 60 attaches to the base of the chassis 54 and includes a perpendicular midplane vertical support 62. An upper midplane 58 attaches to the midplane vertical support 62 and to the vertical supports 56 above the midplane vertical support 62. A vertical midplane 52 attaches to a front edge of the upper midplane 58 and to two of the vertical supports 56. A cooler slide assembly 126 frame is formed by a cooler slide chassis 127 and cooler slide chassis brackets 128 (see FIG. 40) and then attached to the vertical midplane 52 and vertical supports 56. Caster brackets 68 attach to the frame chassis 54. The cooler slide assembly 126 and caster brackets 68 attach to a vertical joiner 66 at the front side of the frame 4. A work tray 24 and garnish and tool cavity 26 frame is connected via work tray doubler plates 149 (see FIG. 42) and then attached to the vertical midplane 52 and vertical supports 56 and are further connected to back vertical doubler plates 64. Finally, with the frame in place, two side panels 6, each curved about a radius to also form a front side, attach to the frame 4 on the right and left sides and to the vertical joiner 66 on the front side. These connections may be made by fasteners through designated drilled holes, welds, or any other type of heavy-duty connection. Together, the frame 4 and side panels 6 form the main housing 3 of the mobile serving cart 2.

The cooler main body 22 is configured for insertion into and attachment to the mobile cart main housing 3. The cooler door 110 is formed by attaching top and bottom pieces of a hollow cooler door foam pan 131 configured for being filled with insulation 115 and enclosed with four cooler door frame members 130. The cooler door assembly 108 further includes cooler door mounting spacers 132 and cooler seals 112 configured for efficiently counteracting heat transfer into the cooler 22. The assembled cooler door 110 is connected to cooler slides 129 attached to a cooler slide chassis 127, and the cooler slide chassis 127 is attached to the cooler main body 22.

With the main housing 3 formed and attached, the back side of the mobile serving cart is configured for receiving the top drawer 28 and bottom drawers 30a, 30b and associated drawer slides. In a preferred embodiment, the drawer slides are located underneath the drawers 28, 30a, 30b. However, alternative embodiments include drawers with side-mounted drawer slides. In an exemplary embodiment, a garnish tray holder 146 is configured for receiving a series of garnish trays 27. The garnish tray holder 146 and a napkin and/or tool bin 147 are configured for fitting within the central, garnish and tool holder cavity 26.

Lastly, in this embodiment, the outer moldings 16, 18, 21 and the cart handle 12 are attached to the mobile serving cart 2. The upper 16 and lower rail moldings 18 are attached to the side panels 6 with spacers 20 between the panels 6 and moldings 16, 18 to accommodate mounting of serving accessories and/or functioning as serving cart bumpers. The cart handle 12, in this embodiment is attached between the back sides of the upper rail molding 16 and the back sides of the side panels 6. Additionally, a vertical molding 21 is installed with spacers 20 over the vertical joiner 66 to complete the front side of the mobile serving cart 2.

In a motive, serve on the go configuration, the compact, mobile serving cart 2 of the present invention is configured to be driven or rolled by an operator around a facility, such as but not limited to a hotel, restaurant, bar, special event, sporting event, or pool area, to make and serve beverages and/or cocktails wherever guests may be. Every detail of the serving cart 2 is specifically tailored and engineered to achieve this task in a professional and efficient manner. There are many uses for a serving cart 2 of the present invention, including but not limited to special table side service of a special house cocktail or serving cold refreshments to guests lounging around a pool.

Pushing a mobile serving cart 2 of the present invention around a facility may be aided by engaging one of the caster wheel pedals 14 located at the operator end, which locks the cart 2 into a straight directional mode and eliminates drifting or axial rotation of the cart 2. Disengaging the directional lock allows the entire cart 2 to swivel in an axial motion, which is often desired for maneuvering within tight spaces such as between tables.

In an exemplary embodiment, the mobile serving cart 2 includes a full lighting system for enhancing both its safety and its visual appeal, activated by a switch behind the cart handle 12 or elsewhere on the cart 2. In this embodiment, the system 2 includes a vertically mounted light strip on the front between the seam of the formed side panels 6 to illuminate the path as the serving cart 2 is rolled. Additionally, light strips may be mounted underneath and within the upper 16 and lower bumper moldings 18 for lighting graphic side panels 6 and for creating ground effect lighting underneath the cart 2.

Once the serving cart 2 of the present invention is in position to serve a guest, the operator can lock the wheels 10 by pressing the lever 14 on one or two wheels, if the cart 2 is on an uneven surface. To begin, the operator typically opens the top drawer 28 by lifting up on the drawer handle 102. Once the drawer 28 is open, the operator can retrieve a glass and fill it with ice from the ice chest 32 within the drawer 28. The glass is then placed on the work surface 24 at the rear of the cart. With the top drawer 28 still open, various bottles can be accessed. The central top compartment 26 may also optionally be loaded with various glasses and bottles, as desired. Once the drink is poured, garnishes, straws, and napkins can be accessed as well in the top central compartment 26. If cold beverages or items are required for a beverage to be made, the cooler 22 on the front can be implemented and those beverages or items received from the cooler 22. The completed beverage can either be handed to the guest or it can be placed on a drink rail adjacent to the cooler to be served later or retrieved by the guest. Any items that need to be disposed of, such as empty cans, wrappers, or used garnishes, can be placed into the trash can 36 housed in a lower drawer 30a. This trash can 36 is easily removed and emptied.

Preferably, all the glasses and bottles in the drawers 28, 30a, 30b are contained in padded compartments that are part of a series removable caddies. In an exemplary embodiment, one caddy 34 is placed within the upper drawer 28, and two caddies 40, 42 are placed within one of the bottom drawers 30b. These caddies 34, 40, 42 preferably each incorporate a handle 102 so that they can easily be lifted out for reloading in a remote area and for cleaning.

In an exemplary embodiment, the serving cart 2 of the present invention is constructed from panels 6, and the joints and seams of these panels 6 are filled with a sealant prior to being painted. Cleaning is as simple as removing the bottles, glasses, bar supplies, and bar tools and wiping the cart 2 down with some mild cleanser or sanitary solution. To drain the cooler, the serving cart 2 includes a valve 121 beneath the cooler 22 near the front and center portion of the cart 2. The serving cart 2 can be rolled over a drain and the valve 121 opened to drain, or a small pan or alternative reservoir can be placed underneath the valve 121.

The serving cart 2 can also be configured as a side operated, stationary bar. To operate as a stationary bar, the mountable upper 40 and lower speed rails 42, the mountable shelf 46, and the mountable bar top 44 are removed from the appropriate bottom drawer 30b and mounted on the rail moldings 16, 18 and knobs 49 via clips 48 and knob-engaging grooves 50, as desired. The user may also open the top drawer 28 for quick access to the ice chest 32 and/or an additional speed rail 34. The cooler door 110 may also be slid open, if desired, for access to the cooler 22 and/or for an auxiliary work surface. These stationary configuration accessories can be quickly set-up and quickly removed to restore the serving cart 2 to its mobile serving on the fly configuration, as desired.

The mobile serving cart 2 of the present invention provides many advantages to users, most notably in the service and hospitality industry. These advantages include improved speed of beverage delivery to customers by decreasing the bartender's workload behind the bar while a separate employee makes and serves beverages using the serving cart 2 of the present invention. The serving cart 2 of the present invention also provides added entertainment value for customers seated at tables and allows for input from customers when preparing beverages. Additionally, the compact design of the serving cart 2 accommodates easy maneuvering of the cart around dining tables, people, and other obstacles. The rounded front edges 8, 19 also help to prevent injury or damage caused by a user running the cart 2 into people or objects. While being compact, the serving cart 2 of the present invention has spaces and features strategically arranged to maximize the capacity of the cart 2. The capacity for bottles, glassware, garnishes, ice, bar supplies, and bar tools allows for extended periods of time preparing and serving beverages without needing to restock the cart 2. Moreover, the features of the serving cart 2 are arranged with everything in reach for most users, with the most-used items positioned closest to the user. This arrangement of designated spaces and features accommodates efficiency in making beverages of the same quality as a bartender at a bar. The construction of the device 2 allows for efficient drink mixing from the same side of the cart 2 as when driving the cart 2, resulting in smooth transitions from rolling to mixing and serving drinks. It also allows for efficient use as a stationary bar with a full-service set-up. Furthermore, the parts of the serving cart 2 are all sealed making cleaning and sterilization quick and easy.

While use of the serving cart 2 of the present invention as a mobile or stationary bar is an exemplary embodiment, serving carts 2 of the present invention can be adapted for other uses. Alternative embodiments include use in serving food or selling merchandise. The cooler 22 could be utilized for cold food, such as but not limited to ice cream. Alternatively, the cooler 22 could be used as a warmer for warm foods. The cooler 22 could also be used as a warmer for hot beverages, such as but not limited to coffee, hot tea, and hot chocolate. In another alternative embodiment, multiple mobile serving devices of the present invention could be positioned together and/or connected to provide a larger service configuration.

It is to be understood that while certain embodiments and/or aspects of the invention have been shown and described, the invention is not limited thereto and encompasses various other embodiments and aspects.

Having thus described the invention, what is claimed as new and desired to be secured by Letters Patent is:

1. A mobile serving cart comprising:
   a main housing comprising a frame and a pair of panels attached to said frame and forming a front side and left and right sides of said mobile serving cart;
   a plurality of wheels attached to said main housing and supporting said mobile serving cart;
   a handle attached to said main housing for directing said mobile serving cart;
   a work space positioned on a top side of said mobile serving cart;
   a cooler housed within said main housing and including a sealable cooler door comprising a slidable door configured for sliding outward beyond said front side of said mobile serving cart when opened;
   a top surface of said cooler door comprises a secondary work space
   a drawer housed within said main housing and forming a back side of said mobile serving cart;
   wherein said mobile serving cart includes a first configuration for mobile service and a second configuration for stationary service; and
   wherein said mobile serving cart is configured for mounting service accessories in said mobile serving cart second configuration.

2. The mobile serving cart according to claim 1, wherein:
   said cooler comprises an insulated cooler; and
   said sealable cooler door is accessible from said top side of said mobile serving cart.

3. The mobile serving cart according to claim 2, wherein:
   said cooler door comprises a magnetic seal; and
   said cooler door further comprises a locking latch.

4. The mobile serving cart according to claim 1, further comprising:
   a rail molding attached to said main housing and extending around said front side and left and right sides of said mobile serving cart; and
   wherein said rail molding is configured for mounting service accessories in said mobile serving cart second configuration.

5. The mobile serving cart according to claim 1, further comprising:
   a removable caddy configured for housing a plurality of beverage ingredients;
   wherein said removable caddy is configured for placement within said drawer in said first configuration; and
   wherein said removable caddy is configured for being mounted on said mobile serving cart in said second configuration.

6. The mobile serving cart according to claim 1, further comprising:
   a mountable bar top attachment configured for placement within said drawer in said first configuration and for being mounted on said mobile serving cart in said second configuration.

7. The mobile serving cart according to claim 1, wherein:
   said drawer comprises a top drawer and a bottom drawer.

8. The mobile serving cart according to claim 7, wherein:
   said top drawer houses a removable speed rail caddy and an ice chest;
   said removable speed rail caddy is configured for holding a plurality of beverage ingredients; and
   opening of said top drawer provides convenient access to said plurality of said beverage ingredients and said ice chest in said first configuration and said second configuration.

9. The mobile serving cart according to claim 7, further comprising:
   an opening between a top surface of said top drawer and said top side of said mobile serving cart accommodating removal and replacement of objects within said top drawer without opening said top drawer.

10. The mobile serving cart according to claim 7, wherein:
    said bottom drawer is longer than said top drawer; and
    said cooler comprises a stair step shape around said top and bottom drawers maximizing usable space within said mobile serving cart main housing.

11. The mobile serving cart according to claim 10, further comprising:
    a cooler divider configured for dividing said cooler into separate sections on each side of said star step shape.

12. The mobile serving cart according to claim 1, further comprising:
    a drain connected to a bottom side of said cooler configured for draining liquid from said cooler out of said main housing.

13. The mobile serving cart according to claim 1, further comprising:
    a cavity accessible from said mobile serving device top side positioned between said work space and said cooler door and configured for housing beverage service items.

* * * * *